US010386668B2

(12) United States Patent
Katsuta et al.

(10) Patent No.: US 10,386,668 B2
(45) Date of Patent: Aug. 20, 2019

(54) DISPLAY DEVICE, INPUT DETECTION DEVICE AND ELECTRONIC APPARATUS

(71) Applicant: Japan Display Inc., Tokyo (JP)

(72) Inventors: Tadayoshi Katsuta, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/299,694

(22) Filed: Mar. 12, 2019

(65) Prior Publication Data
US 2019/0204644 A1 Jul. 4, 2019

Related U.S. Application Data

(63) Continuation of application No. 15/686,691, filed on Aug. 25, 2017.

(30) Foreign Application Priority Data

Aug. 26, 2016 (JP) .................................. 2016-165310
Aug. 22, 2017 (JP) .................................. 2017-159451

(51) Int. Cl.
  *G06F 3/041*  (2006.01)
  *G02F 1/1333* (2006.01)
  (Continued)

(52) U.S. Cl.
  CPC ........ *G02F 1/13338* (2013.01); *G02F 1/1343* (2013.01); *G06F 3/044* (2013.01); *G06F 3/046* (2013.01); *G06F 3/0412* (2013.01); *G06F 3/0416* (2013.01); *G06F 2203/04106* (2013.01); *G06F 2203/04112* (2013.01)

(58) Field of Classification Search
  CPC ............ G06F 3/046; G06F 3/03; G06F 3/041;
  G06F 3/047; G06F 3/044; G06F 3/045;
  G02F 1/13
  See application file for complete search history.

(56) References Cited

U.S. PATENT DOCUMENTS 5,693,913 A 12/1997 Sudo et al.
2007/0124515 A1* 5/2007 Ishikawa .................. G06F 3/046
  710/15
(Continued)

FOREIGN PATENT DOCUMENTS

JP   H10-049301 A   2/1998
JP   2006-085488 A  3/2006
JP   2006-085490 A  3/2006

*Primary Examiner* — Pegeman Karimi
(74) *Attorney, Agent, or Firm* — K&L Gates LLP

(57) ABSTRACT

In, for example, such an in-cell touch panel of an electromagnetic induction method as to generate a magnetic field for touch detection in a display device, provided is an input detection device in which even an end portion of a display area can generate the same magnetic field as that generated at a center of the display area. The input detection device includes a plurality of first drive electrodes placed in a detection area; a second drive electrode placed in a frame area; and a second drive circuit driving the second drive electrode. In addition, the plurality of first drive electrodes and the second drive electrode extend in a first direction to be arranged in a second direction crossing the first direction, and the second drive electrode and the second drive circuit are arranged in the first direction in the frame area.

20 Claims, 16 Drawing Sheets

(51) Int. Cl.
    *G06F 3/046*     (2006.01)
    *G06F 3/044*     (2006.01)
    *G02F 1/1343*     (2006.01)

(56) References Cited

U.S. PATENT DOCUMENTS

| | | |
|---|---|---|
| 2010/0053127 A1* | 3/2010 | Takenaka ............ G02F 1/13452 345/204 |
| 2013/0249854 A1 | 9/2013 | Katsurahira |
| 2014/0028587 A1 | 1/2014 | Sugiyama |
| 2016/0147339 A1 | 5/2016 | Teranishi et al. |
| 2017/0278445 A1* | 9/2017 | Nishiguchi .............. G09G 3/36 |
| 2018/0025696 A1* | 1/2018 | Su ........................ G09G 5/003 345/213 |
| 2018/0120971 A1 | 5/2018 | Lee et al. |

\* cited by examiner

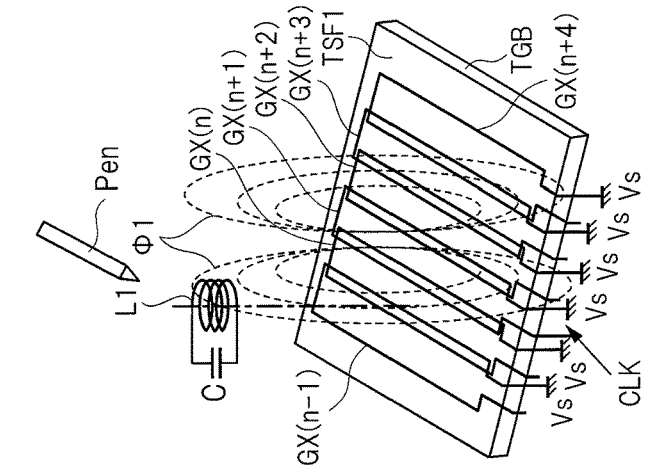
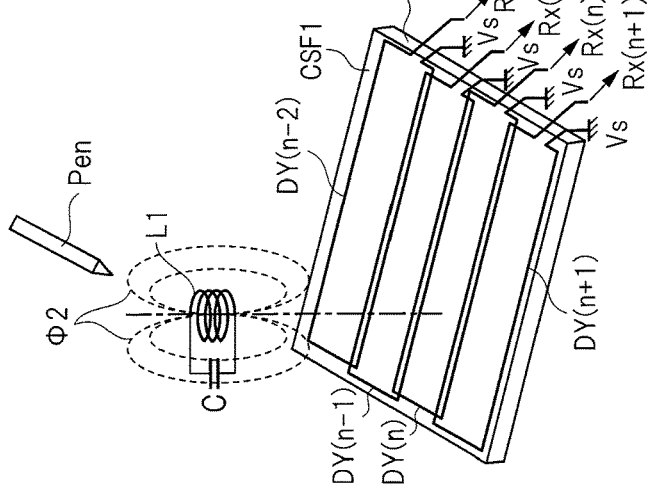
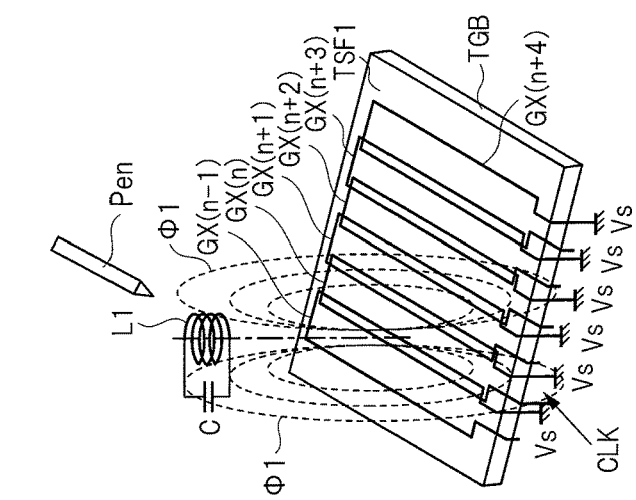

DISPLAY DEVICE, INPUT DETECTION DEVICE AND ELECTRONIC APPARATUS

CROSS-REFERENCE TO RELATED APPLICATION

The present application is a continuation of U.S. application Ser. No. 15/686,691, filed on Aug. 25, 2017, which application claims priority from Japanese Patent Application Nos. 2016-165310 and 2017-159451 filed on Aug. 26, 2016 and Aug. 22, 2017, the contents of which are hereby incorporated by reference into this application.

TECHNICAL FIELD OF THE INVENTION

The present invention relates to a display device, an input detection device, and an electronic apparatus and, in particular, to a display device, an input detection device, and an electronic apparatus having a touch detection function capable of detecting proximity of an external object.

BACKGROUND OF THE INVENTION

In recent years, attention has been paid to, as an input detection device, an input detection device having a touch detection function capable of detecting proximity (hereinafter, also including contact) of an external object, and such a device is called a touch panel. The touch panel is provided as a display device with a touch detection function, which is attached to or integrated in a display device, for example, a liquid crystal display device.

As an external object, for example, there is a touch panel enabling use of a pen. By using the pen, for example, a small area can be designated, or a handwritten character(s) can be inputted. There are various technologies for detecting a touch of the pen. One of the various technologies is an electromagnetic induction method. Since the electromagnetic induction method can realize high accuracy and high writing pressure detection accuracy, and can also realize a hovering detection function of detecting the external object separated from a touch panel surface, the electromagnetic induction method is a useful technology as a technology to detect the touch of the pen.

In addition, there is a touch detection device capable of detecting a finger(s) or the like as an external object. In this case, since a detection target is different from the pen, a method different from the electromagnetic induction method is adopted as a technology for detecting the touch. For example, there is a method for detecting an optical change, a change in a resistance value, or a change in an electric field caused by the touch of the finger or the like. Among these methods, the method for detecting the change in the electric field includes, for example, an electrostatic capacitance method using electrostatic capacitance. Since the electrostatic capacitance method has a relatively simple structure and has low power consumption, the electrostatic capacitance method is used for a personal digital assistant and the like.

Technologies related to the touch panel of the electromagnetic induction method are described in, for example, Patent Document 1 (Japanese Patent Application Laid-open No. 10-49301).

SUMMARY OF THE INVENTION

Display devices with a touch detection function include: a so-called in-cell type display device integrating a touch panel with a display device; and a so-called on-cell type display device attaching a touch panel to a display device.

When touch detection of an electromagnetic induction method is performed by the in-cell type display device, a common electrode in a display area is considered to be used as a drive electrode for generating a magnetic field. However, in this case, there has been a problem in which a magnetic field is more difficult to generate in an area of the common electrode arranged at or near the farthest end portion of the display area than in a center of the display area.

Patent Document 1 describes an in-cell type touch panel in which a segment electrode and a common electrode in a liquid crystal panel are used as the detection electrodes for the magnetic field touch detection, but neither describes nor suggests generating a magnetic field by using the electrodes in the liquid crystal panel, and the problem in that case.

An object of the present invention is to provide an input detection device in which even the end portion of the display area can generate the same magnetic field as that generated at the center of the display area in, for example, such an in-cell touch panel of an electromagnetic induction method as to generate a magnetic field for touch detection in a display device.

The input detection device according to an embodiment of the present invention includes a plurality of first drive electrodes arranged in a detection area, a second drive electrode arranged in a frame area, and a second drive circuit for driving the second drive electrode. Then, the plurality of first drive electrodes and the second drive electrode extend in a first direction and are arranged in a second direction crossing the first direction, and the second drive electrode and the second drive circuit are arranged in the first direction in the frame area.

BRIEF DESCRIPTIONS OF THE DRAWINGS

FIG. 2A is an explanatory diagram showing a principle of magnetic field detection;

FIG. 2B is an explanatory diagram showing the principle of magnetic field detection;

FIG. 2C is an explanatory diagram showing the principle of magnetic field detection;

DESCRIPTIONS OF THE PREFERRED EMBODIMENTS

Figure 1A:
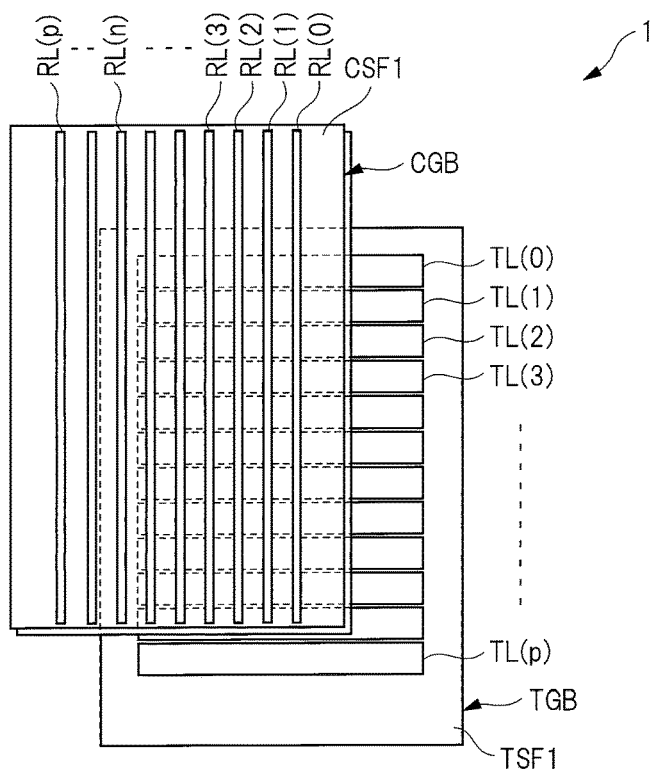
FIG. 1A is a plan view showing the configuration of a display device.

In the following, each embodiment of the present invention will be described with reference to the drawings. It should be noted that the disclosure is merely an example, and appropriate changes with the gist of the invention kept which can be easily made by a person skilled in the art are naturally included in the scope of the present invention. In addition, in order to make the description clearer, the drawings may schematically represent the width, the thickness, the shape, and the like of each part as compared with the actual form, but it is only an example and the construction of the present invention is not limited thereto.

In addition, in the present specification and each of the Figures, the same reference numerals are given to the same elements as those previously described with reference to the preceding Figures, and their detailed descriptions may be omitted appropriately. In the following description, a liquid crystal display device with a touch detection function will be described as an example of an input detection device, but the present invention is not limited thereto. For example, the input detection device may be an OLED display device with a touch detection function, a touch panel not having a display function, or the like.

First Embodiment

In a first embodiment, a described will be display device capable of detecting contact or proximity of both of a pen and a finger(s), that is, a display device incorporating input devices of an electromagnetic induction method and an electrostatic capacitance method. The display device of the first embodiment can perform a display operation, an input detection operation of the electromagnetic induction method, and an input detection operation of the electrostatic capacitance method in a time division manner by the same device configuration. Although the display device of the first embodiment is a display device for displaying an image by using liquid crystal, it is not limited to the liquid crystal, and the image display may be performed by using an OLED or the like.

<Basic Configuration of Display Device>

Figure 1B:
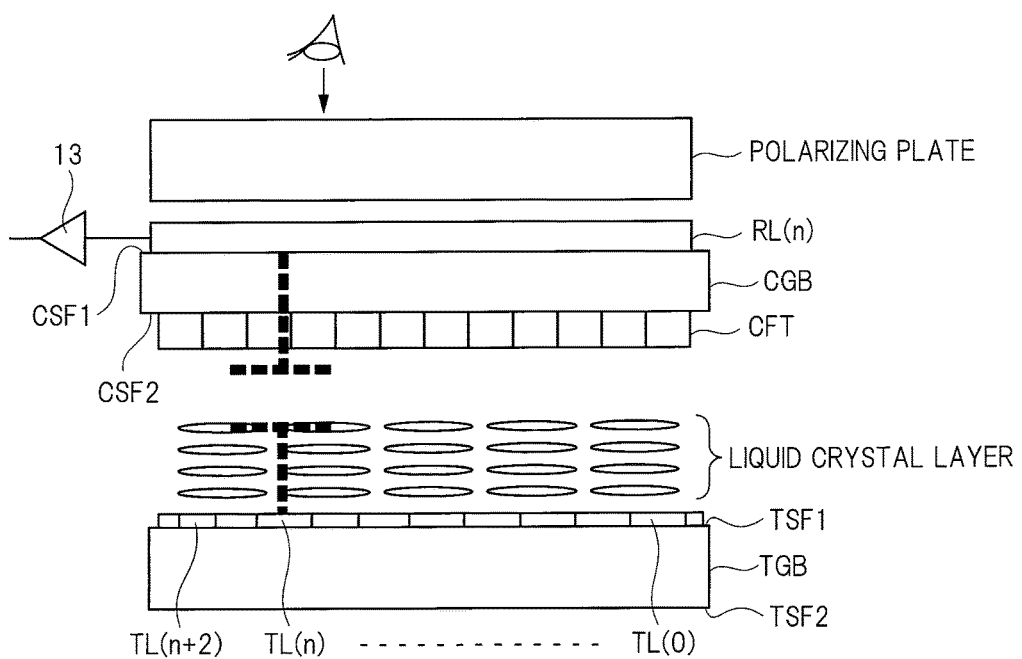
FIG. 1B is a cross-sectional view showing the configuration of a display device.

FIGS. 1A and 1B are diagrams schematically showing the configuration of the display device. In FIGS. 1A and 1B, reference numeral "1" denotes a display device, FIG. 1A is a plan view showing a plane of the display device 1, and FIG. 1B is a cross-sectional view showing a cross section of the display device 1. The display device 1 includes: a first substrate TGB; a layer laminated on the first substrate TGB; a color filter CFT; a second substrate CGB; and a layer laminated on the second substrate CGB. The first substrate TGB and the second substrate CGB are insulating substrates. For example, each of the first substrate TGB and the second substrate CGB is a glass substrate or a film substrate.

In FIG. 1A, "TL(0)" to "TL(p)" indicate drive electrodes constituted by layers formed on a first main surface TSF1 of the first substrate TGB. The drive electrodes TL(0) to TL(p) function as the common electrodes for a display operation, the drive electrodes for magnetic field generation, and the drive electrodes for electric field generation. In addition, "RL(0)" to "RL(p)" indicate the detection electrodes constituted by layers formed on a first main surface CSF1 of the second substrate CGB. The detection electrodes RL(0) to RL(p) function as the detection electrodes for magnetic field detection and the detection electrodes for electric field detection. As shown in FIG. 1B, the first substrate TGB and the second substrate CGB in FIG. 1A sandwich the liquid crystal layer therebetween and are arranged so that the first main surface TSF1 of the first substrate TGB and the second main surface CSF2 of the second substrate CGB face each other.

As shown in FIG. 1B, the drive electrodes TL(0) to TL(n+2), the liquid crystal layer, and the color filter CFT are arranged between the first main surface TSF1 of the first substrate TGB and the second main surface CSF2 of the second substrate CGB. In addition, a plurality of detection electrodes RL(0) to RL(p) shown in FIG. 1A and a polarizing plate are arranged on the first main surface CSF1 of the second substrate CGB. In addition, in FIG. 1B, reference numeral "13" denotes a unit detection circuit connected to the detection electrode RL(n).

In the present specification, a state of viewing the display device 1 from a direction perpendicular to the first main surfaces CSF1 and TSF1 in FIG. 1B will be described as a plan view. When viewed in a plan view, the drive electrodes TL(0) to TL(p) extend in a row direction (lateral direction), and are arranged parallel to a column direction (longitudinal direction) on the first main surface TSF1 of the first substrate TGB as shown in FIG. 1A. In addition, the detection electrodes RL(0) to RL(p) extend in the column direction (longitudinal direction), and are arranged parallel to the row direction (lateral direction) on the first main surface CSF1 of the second substrate CGB as shown in FIG. 1A.

The drive electrodes TL(0) to TL(p) and the detection electrodes RL(0) to RL(p) are electrically separated from each other via the second substrate CGB, the liquid crystal layer, and the like. At this time, capacitance formed between the drive electrode and the detection electrode is indicated by a broken line in FIG. 1B.

In this embodiment, the drive electrodes TL(0) to TL(p) and the detection electrodes RL(0) to RL(p) are arranged to be orthogonal to each other, but are not limited thereto and may be arranged to intersect each other obliquely.

<Principle of Magnetic Field Detection>

FIGS. 2A to 2C are explanatory diagrams showing a principle of magnetic field detection. A period of the magnetic field detection includes: a magnetic field generation period for generating a magnetic field; and a magnetic field detection period for detecting the magnetic field. FIGS. 2A and 2C show an operation during the magnetic field generation period, and FIG. 2B shows an operation during the magnetic field detection period.

In the present embodiment, the drive electrodes TL(0) to TL(p) shown in FIGS. 1A and 1B are used as the drive electrodes for generating magnetic fields. In a magnetic field generation period, the predetermined drive electrodes arranged apart from each other among the drive electrodes TL(0) to TL(p) mutually arranged in parallel are connected in series, and a different drive voltage is supplied to each end portion thereof. Therefore, currents flow through the drive electrodes to generate the magnetic fields. For example, right-side end portions of the drive electrodes TL(0) and TL(2) shown in FIGS. 1A and 1B are electrically connected to each other. Then, supplying a first voltage Vs is supplied from a left-side end portion of the drive electrode TL(0), and a magnetic field drive signal having a voltage value different from the first voltage Vs is supplied from a left-side end portion of the drive electrode TL(2). Thereby, currents flow through the drive electrodes TL(0) and TL(2) to generate a magnetic field centered around an area of the drive electrode TL(1) sandwiched therebetween. Here, the magnetic field drive signal is a signal whose voltage periodically changes. At this time, the drive electrodes TL(0) and TL(2) can be regarded as magnetic field generation coils. For example, the first voltage Vs is a ground voltage or a reference voltage.

In FIG. 2A, "GX(n−1)" indicates the magnetic field generation coil constituted by the drive electrodes TL(0) and TL(2), and "GX(n)" to "GX(n+4)" respectively indicate magnetic field generation coils constituted by the drive electrodes TL(1) and TL(3) to TL(p) in the same manner as the magnetic field generation coil GX(n−1).

In FIG. 2A, a capacitive element C and a coil L1 are connected in parallel so as to form a resonance circuit, and are incorporated in a pen Pen. In the magnetic field generation period, the first voltage Vs is supplied to one end portion of each of the magnetic field generation coils GX(n−1) to GX(n+3). At this time, when a magnetic field drive signal CLK is supplied to the other end portion of the magnetic field generation coil GX(n), the magnetic field generation coil GX(n) generates a magnetic field φ1 according to a voltage change in the magnetic field drive signal CLK. If the pen Pen is close to the magnetic field generation coil GX(n), the magnetic field generation coil GX(n) and the coil L1 are electromagnetically coupled, an induced voltage due to mutual induction is generated in the coil L1 by the magnetic field φ1, and the capacitive element C is charged.

In the magnetic field detection period, the detection of the magnetic field is performed by using the detection electrodes RL(0) to RL(p) shown in FIGS. 1A and 1B. The predetermined detection electrodes apart from each other among the detection electrodes RL(0) to RL(p) mutually arranged in parallel are selected to be connected in series, and thereby constitute the magnetic field detection coil. For example, the magnetic field detection coil constituted by electrically connecting the detection electrodes RL(0) and RL(3) with each other at their upper-side end portions in FIG. 1A detects the magnetic field about areas of the detection electrodes RL(1) and RL(2).

In FIG. 2B, "DY(n−2)" denotes a magnetic field detection coil constituted by the detection electrodes RL(0) and RL(3), and "DY(n−1)" to "DY(n+1)" similarly denote magnetic field detection coils constituted by the detection electrodes RL(2) to RL(p). During the magnetic field detection period, the first voltage Vs is supplied to the one end portion of each of the magnetic field detection coils DY(n−1) to DY(n+1), and the respective signals Rx(n−2) to Rx(n+1) at the other end portions of the magnetic field detection coils are supplied to unit detection circuits.

If the capacitive element C is charged during the magnetic field generation period, the coil L1 built in the pen generates a magnetic field φ2 that varies depending on a resonance frequency of the resonance circuit according to the charges charged in the capacitive element C during the magnetic field detection period. In FIG. 2B, the pen exists, that is, a center of the coil L1 (one-dot chain line) exists inside the magnetic field detection coil DY(n). Therefore, electromagnetic coupling occurs between the magnetic field detection coil DY(n) and the coil L1, and an induced voltage is generated in the magnetic field detection coil DY(n) by mutual induction. As a result, the signal Rx(n) at the other end portion of the magnetic field detection coil DY(n) changes depending on an amount of charges charged in the capacitive element C. The unit detection circuit connected to the magnetic field detection coil DY(n) outputs, as a detection signal, the change in this signal Rx(n). This allows extraction of whether or not the pen Pen is close (touched) thereto and extraction of its coordinates. In addition, since the detection signal varies depending on the charge amount, a distance between the pen Pen and the magnetic field detection coil can be obtained.

FIG. 2C shows the magnetic field generation period shifted following FIG. 2B. A difference from FIG. 2A is that the magnetic field drive signal CLK is supplied to the magnetic field generation coil GX(n+1). Since a position of the pen Pen has not changed, no induced voltage is generated in the coil L1 and the capacitive element C is not charged during the magnetic field generation period shown in FIG. 2C. Thereby, during the magnetic field detection period shifted following FIG. 2C, it is detected that the pen Pen is not close thereto. Hereinafter, the pen Pen is detected in the same manner.

<Principle of Electric Field Detection>

Figure 3A:
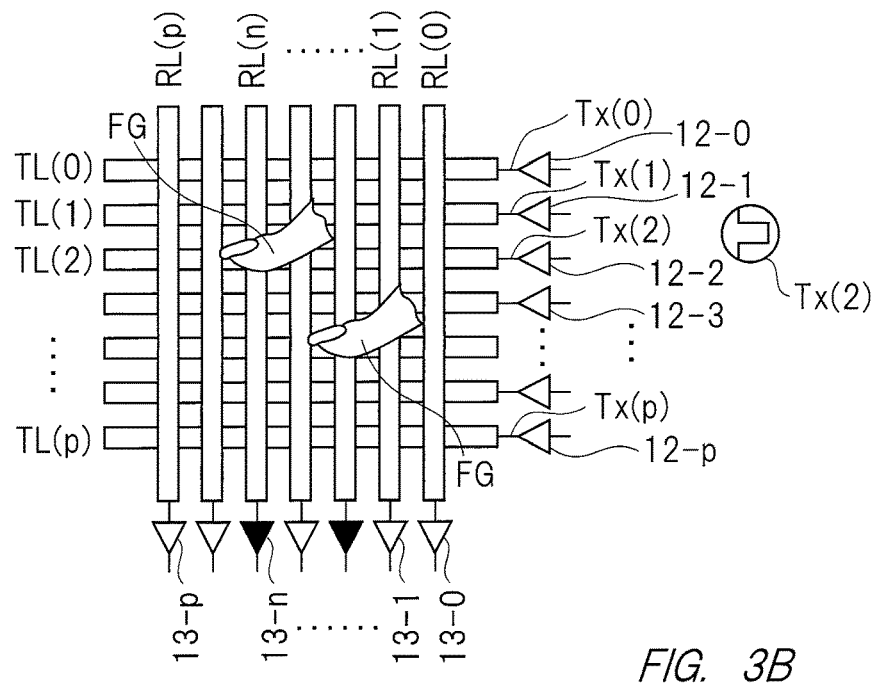
FIG. 3A is an explanatory diagram showing a principle of electric field detection.
Figure 3B:
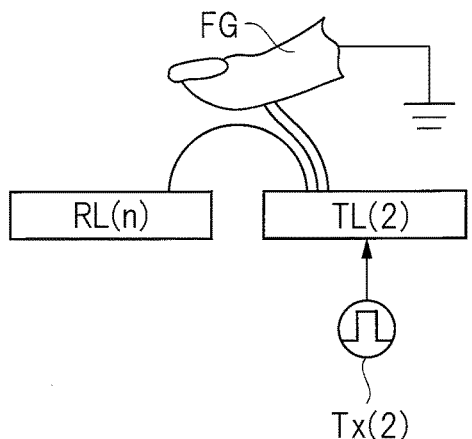
FIG. 3B is an explanatory diagram showing the principle of electric field detection.
Figure 3C:
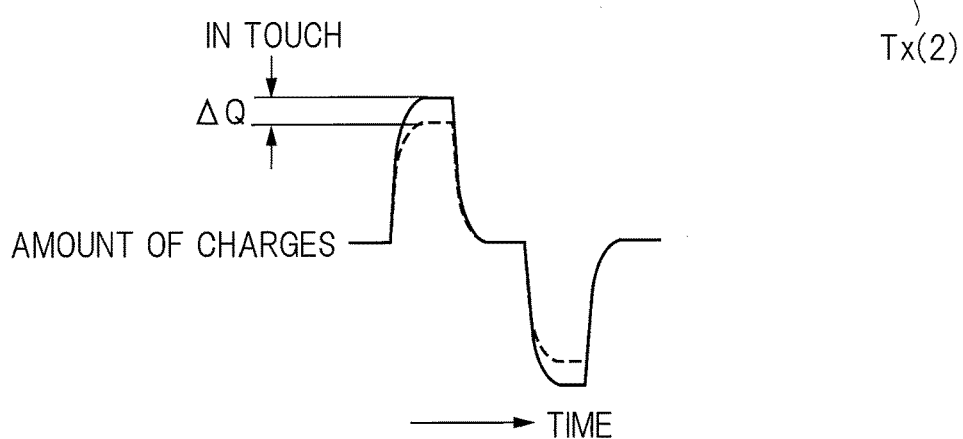
FIG. 3C is an explanatory diagram showing the principle of electric field detection.

FIGS. 3A to 3C are explanatory diagrams showing a principle of electric field detection. In FIG. 3A, each of "12-0" to "12-p" shows a unit drive circuit for outputting an electric field drive signal, and each of "13-0" to "13-p" shows a unit detection circuit. In addition, in FIG. 3A, a pulse signal surrounded by a solid line circle (o) shows a waveform of the electric field drive signal Tx(2) supplied to the drive electrode TL(2). As an external object, a finger is denoted as FG.

When the electric field drive signal Tx(2) is supplied to the drive electrode TL(2), an electric field is generated between the drive electrode TL(2) and the detection electrode RL(n) orthogonal to the drive electrode TL(2) as shown in FIG. 3B. At this time, if the finger FG touches vicinity of the drive electrode TL(2), an electric field is also generated between the finger FG and the drive electrode TL(2), and the electric field generated between the drive electrode TL(2) and the detection electrode RL(n) decreases. Thereby, the charge amount between the drive electrode TL(2) and the detection electrode RL(n) is reduced. As a result, as shown in FIG. 3C, when the finger FG is touched, the charge amount generated in response to supply of the drive signal Tx(2) decreases by ΔQ as compared with a case where it is not touched. A difference in the charge amount emerges as a voltage difference, is supplied to the unit detection circuit 13-n, and is then outputted as a detection signal.

Also regarding other drive electrodes similarly, by supplying electric field drive signals, voltage changes in signals depending on whether or not the finger FG is touched occur in the detection electrodes RL(0) to RL(p), and are then outputted as detection signals. This allows the extraction of whether or not the finger FG is touched and the extraction of its coordinates.

Incidentally, the drive electrodes TL(0) to TL(p) shown in FIGS. 1A and 1B function as, for example, a common electrode during their display operations, and the same display drive signal is supplied to all of the drive electrode.

<Overall Configuration of Display Device>

Figure 4:
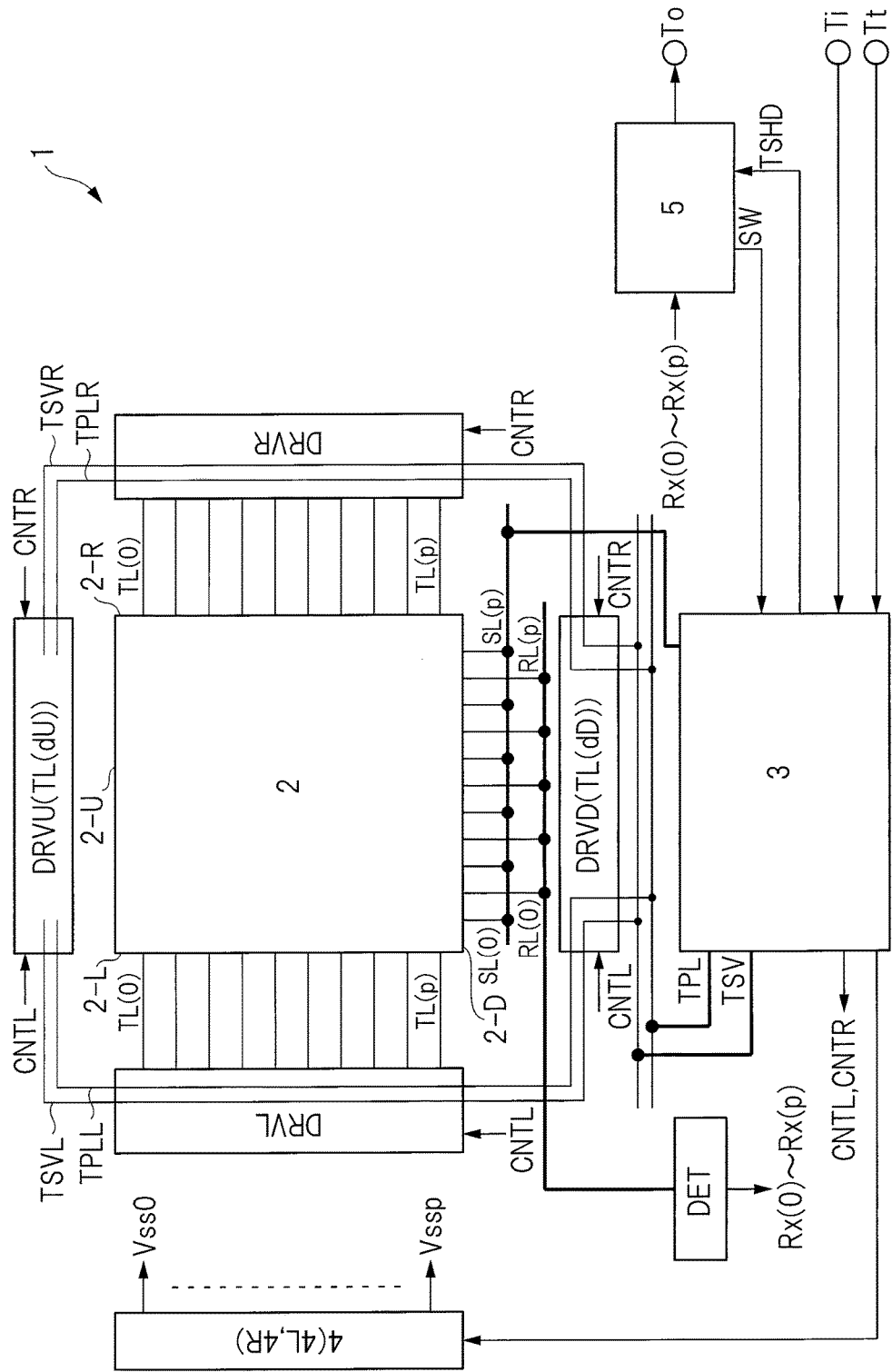
FIG. 4 is a block diagram showing a configuration of a display device according to a first embodiment.

FIG. 4 is a block diagram showing a configuration of a display device 1 according to an embodiment. In FIG. 4, the display device 1 includes a display panel (liquid crystal panel), a control device 3, a gate driver 4 (gate drivers 4L and 4R), and a touch control device 5. In addition, the display device 1 includes first drive electrodes DRVL and DRVR, second drive electrodes DRVU and DRVD, and a detection circuit DET. The display panel includes a display area for the display, and a frame area around the display area. When viewed from the viewpoint of display, the display area is an active area and the frame area surrounding the display area is an inactive area. In FIG. 4, reference numeral "2" denotes the display area. In addition, the display area 2 is an area for magnetic field touch detection due to an electromagnetic induction method and for electric field touch detection due to an electrostatic capacitance method.

The display area 2 includes a pixel array in which a plurality of pixels are arranged in a matrix. In the pixel array, a plurality of signal lines, a plurality of pixel electrodes, a plurality of first drive electrodes, a plurality of scanning lines, and a plurality of detection electrodes are arranged. When a description is made with reference to FIG. 4, the signal lines SL(0) to SL(p) in the pixel array extend in the longitudinal direction (column direction) and are arranged parallel to the lateral direction (row direction). In addition, the first drive electrodes TL(0) to TL(p) extend in the lateral direction and are arranged parallel to the longitudinal direction. The pixel electrodes are arranged in a matrix. Furthermore, the scanning lines extend in the lateral direction and are arranged parallel to the longitudinal direction, and the detection electrodes RL(0) to RL(p) extend in the longitudinal direction and are arranged parallel to the lateral direction. In this case, the pixels are arranged in a space formed by crossing the plurality of signal lines and the plurality of scanning lines. In the period for the display (display period), the pixel is selected by the signal line and the scanning line, a voltage of the pixel electrode provided via the signal line and a voltage of the first drive electrode at the moment are applied to the selected pixel, and the selected pixel is displayed according to a voltage difference between the pixel electrode and the first drive electrode.

The control device 3 receives a timing signal supplied to an external terminal Tt, and image information supplied to an input terminal Ti, and forms an image signal in accordance with the image information in the display period, and supplies it to the plurality of signal lines SL(0) to SL(p). In addition, the control device 3 receives the timing signal supplied to the external terminal Tt, and a control signal SW from the touch control device 5, and forms various signals. In FIG. 4, only signals needed for description among the signals formed by the control device 3 are drawn as representatives. That is, the control device 3 forms a synchronization signal TSHD, and the control signals CNTL and CNTR. In addition, although not particularly limited, the control device 3 forms drive signals TPL and TSV.

The synchronization signal TSHD is a synchronization signal for discriminating between a display period for performing the display and a touch detection period for performing the touch detection in the display area 2. The control device 3 controls the touch control device 5 so as to be operated by the synchronization signal TSHD during the touch detection period.

At a time of display, the gate driver 4 forms the scanning line signals Vss0 to Vssp in accordance with the timing signal from the control device 3, and supply them to the scanning lines in the display area 2. In the display period, the pixel connected to the scanning line to which the high-level scanning line signal is supplied is selected, and the selected pixel performs display according to the image signal supplied to the signal lines SL(0) to SL(p) at the moment.

The detection circuit DET detects a change in the signals of the detection electrodes RL(0) to RL(p) to output it as detection signals Rx(0) to Rx(p) at the times of the magnetic field touch detection by an electromagnetic induction method and the electric field touch detection by an electrostatic capacitance method.

The touch control device 5 receives the detection signals Rx(0) to Rx(p), extracts coordinates of the touched position, and outputs them from the external terminal To. In addition, the touch control device 5 outputs the control signal SW and receives the synchronization signal TSHD, and operates in synchronization with the display control device 3.

The display area 2 has sides 2-U and 2-D parallel to a row of the pixel array and sides 2-R and 2-L parallel to a column of the pixel array. Here, the side 2-U and the side 2-D are sides facing each other, and the plurality of first drive electrodes TL(0) to TL(p) and the plurality of scanning lines in the pixel array are arranged between the two sides. In addition, the side 2-R and the side 2-L are also sides facing each other, and the plurality of signal lines SL(0) to SL(p) and the plurality of detection electrodes RL(0) to RL(p) in the pixel array are arranged between the two sides.

The first drive circuit DRVL is arranged along the side 2-L of the display area 2, and is connected to one end portion of each of the first drive electrodes TL(0) to TL(p). Similarly, the first drive circuit DRVR is arranged along the side 2-R of the display area 2, and is connected to the other end portion of each of the first drive electrodes TL(0) to TL(p).

Figure 9:
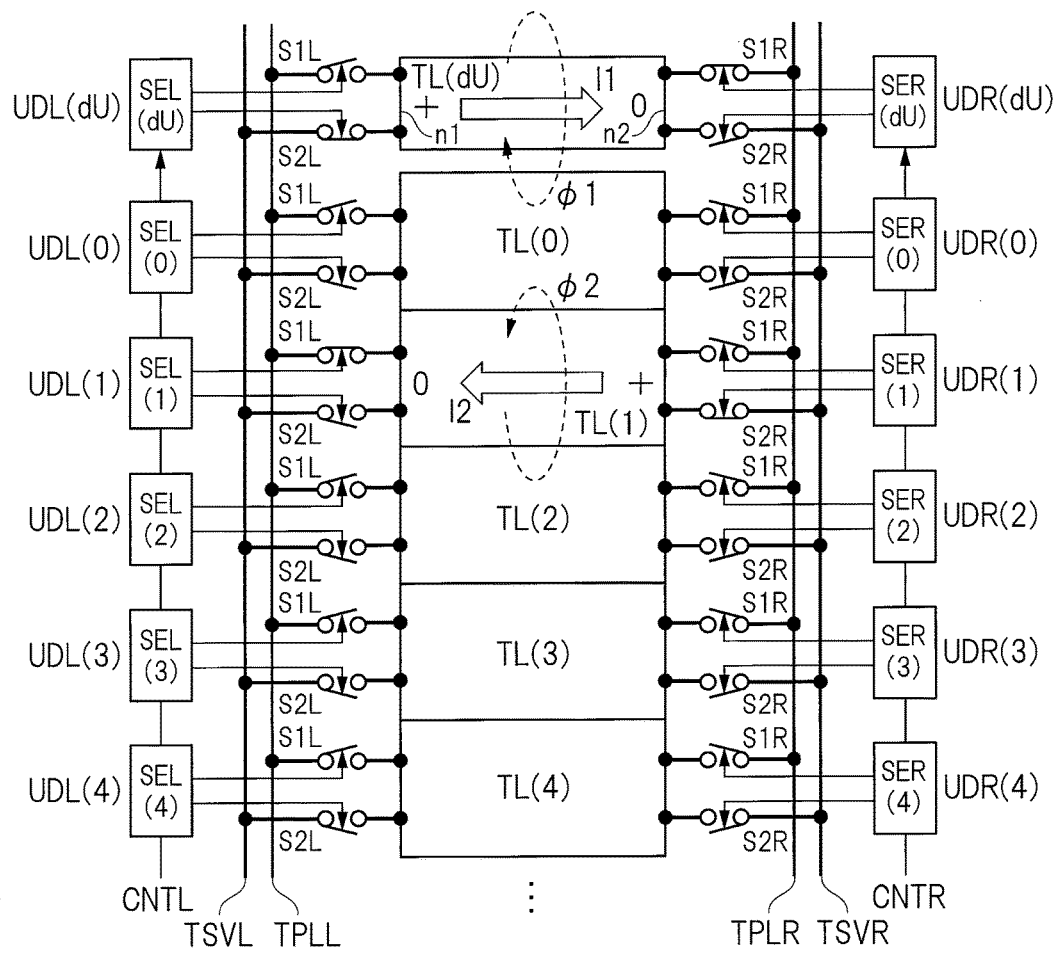
FIG. 9 is a plan view showing configurations of drive circuits and drive electrodes according to a first embodiment.
Figure 10:
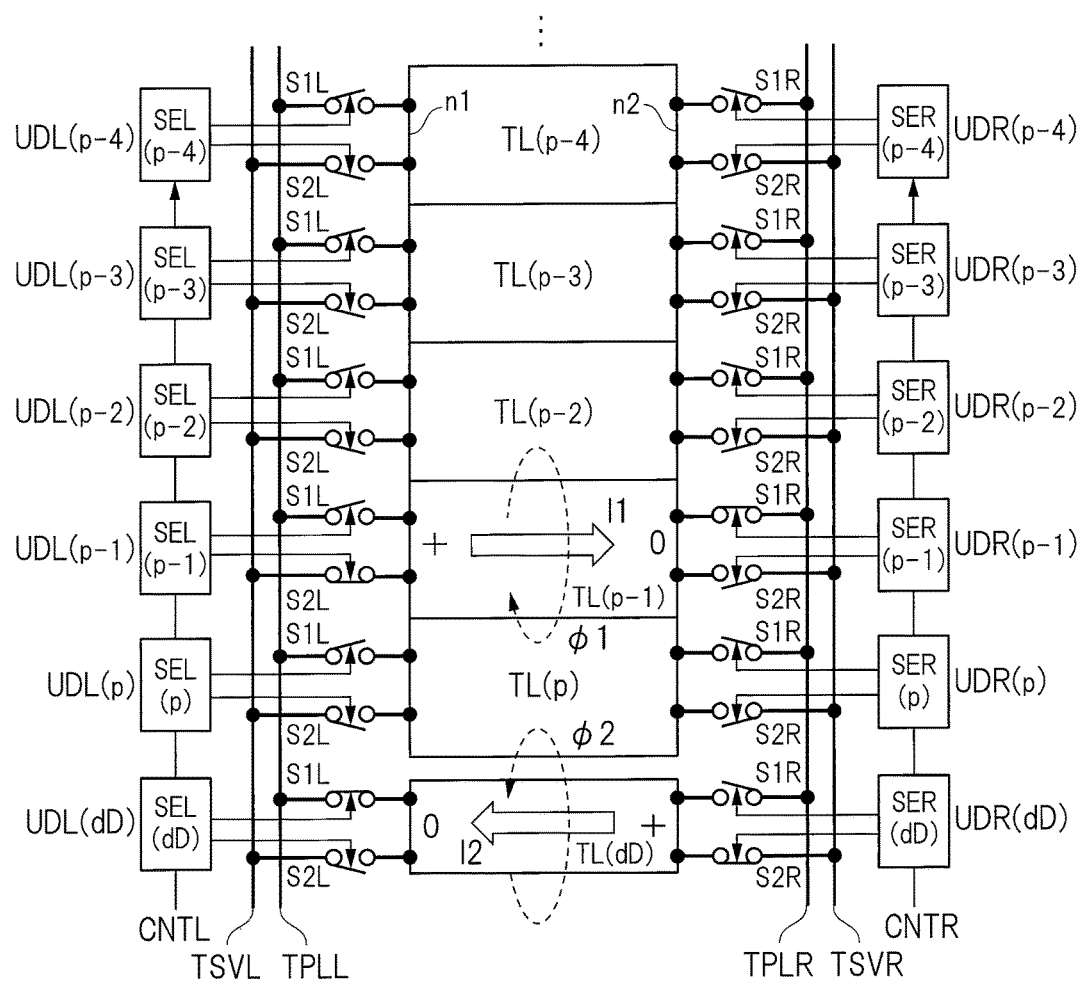
FIG. 10 is a plan view showing configurations of drive circuits and drive electrodes according to a first embodiment.

The first drive circuits DRVL and DRVR include first switches (S1L, S2L, SIR, and S2R shown in FIGS. 9 and 10) for connecting the first drive electrodes and signal wirings TPLL, TSVL, TPLR, and TSVR for supplying drive voltages to the first drive electrodes TL(0) to TL(p); and first selection circuits (SEL(0) to SEL(p) and SER(0) to SER(p) shown in FIGS. 9 and 10) for selecting the first drive electrodes by switching the first switches. The first selection circuit forms, based on the control signals CNTL and CNTR, a selection signal for selecting the desired first drive electrode from among the first drive electrodes TL(0) to TL(p) at the times of the magnetic field touch detection and the electric field touch detection. This selection signal switches the first switch to select the first drive electrode.

The first drive circuits DRVL and DRVR select the desired first drive electrode from among the first drive electrodes TL(0) to TL(p) to supply a magnetic field drive signal to the selected first drive electrode at the time of the magnetic field touch detection, and select the desired first drive electrode to supply an electric field drive signal to the selected first drive electrode also at the time of the electric field touch detection.

A second drive electrode TL(dU) as a dummy drive electrode for generating a magnetic field is arranged in a frame area (upper-side frame area) outside the display area 2. Similarly, a second drive electrode TL(dD) as a dummy drive electrode for generating a magnetic field is arranged in the frame area (lower-side frame area) outside the display area 2.

Here, the dummy drive electrode for generating a magnetic field means a drive electrode, which is arranged outside the display area 2 and performs only the magnetic field generation operation without performing the display operation, unlike the first drive electrodes TL(0) to TL(p). In addition, although not necessarily limited, the dummy drive electrode does not perform the electric field generation operation, either.

The second drive circuit DRVU is arranged along the side 2-U of the display area 2 and is connected to one end portion and the other end portion of the second drive electrode TL(dU). Similarly, the second drive circuit DRVD is arranged along the side 2-D of the display area 2 and is connected to one end portion and the other end portion of the second drive electrode TL(dD).

Similarly to the first drive circuits DRVL and DRVR, the second drive circuits DRVU and DRVD also include: second switches (S1L, S2L, S1R, and S2R shown in FIGS. 9 and 10) for connecting the second drive electrodes and the signal wirings TPLL, TSVL, TPLR, and TSVR for supplying drive voltages to the second drive electrodes TL(dU) and TL(dD); and second selection circuits (SEL(dU), SER(dU), SEL(dD), and SER(dD) shown in FIGS. 9 and 10) for selecting the second drive electrodes by switching the second switches. The second selection circuit forms, based on the control signals CNTL and CNTR, a selection signal for selecting the desired second drive electrode from among the second drive electrodes TL(dU) and TL(dD) at the times of the magnetic field touch detection and the electric field touch detection. This selection signal switches the second switch to select the second drive electrode.

The second drive circuit DRVU selects the second drive electrode TL(dU) to supply a magnetic field drive signal in the magnetic field touch detection period. The second drive circuit DRVD selects the second drive electrode TL(dD) to supply a magnetic field drive signal.

In FIG. 4, each of TPLL, TPLR; and TSVL, TSVR represents a signal wiring. The signal wirings TPLL and TSVL extend along the side 2-L of the display area 2. The signal wirings TPLL and TSVL include end portions extending along the sides 2-U and 2-D of the display area 2. Similarly, the signal wirings TPLR and TSVR extend along the side 2-R of the display area 2. The signal wirings TPLR and TSVR include end portions extending along the sides 2-U and 2-D of the display area 2.

The first drive circuit DRVL connects the selected first drive electrode to the signal wiring TPLL or TSVL at the times of the magnetic field touch detection and the electric field touch detection. Similarly, the first drive circuit DRVR connects the selected first drive electrode to the signal wiring TPLR or TSVR at the times of the magnetic field touch detection and the electric field touch detection. The second drive circuits DRVU and DRVD also connect the selected second drive electrode to the signal wiring TPLL or TSVL, and the signal wiring TPLR or TSVR at the time of the magnetic field touch detection, respectively.

The drive signals TPL and TSV formed by the control device 3 are supplied to the end portions of the signal wirings TPLL and TPLR; and TSVL and TSVR, respectively. At the time of the magnetic field touch detection, the drive signals TPL and TSV propagating through the signal wirings TPLL and TPLR; and TSVL and TSVR are supplied to the selected first drive electrode and second drive electrode, and a magnetic field is generated. In addition, at the time of the electric field touch detection, the drive signals TPL and TSV propagating through the signal wirings TPLL and TPLR; and TSVL and TSVR are supplied to the selected first drive electrode and second drive electrode, and an electric field is generated.

<Module Configuration of Display Device 1>

Figure 5:
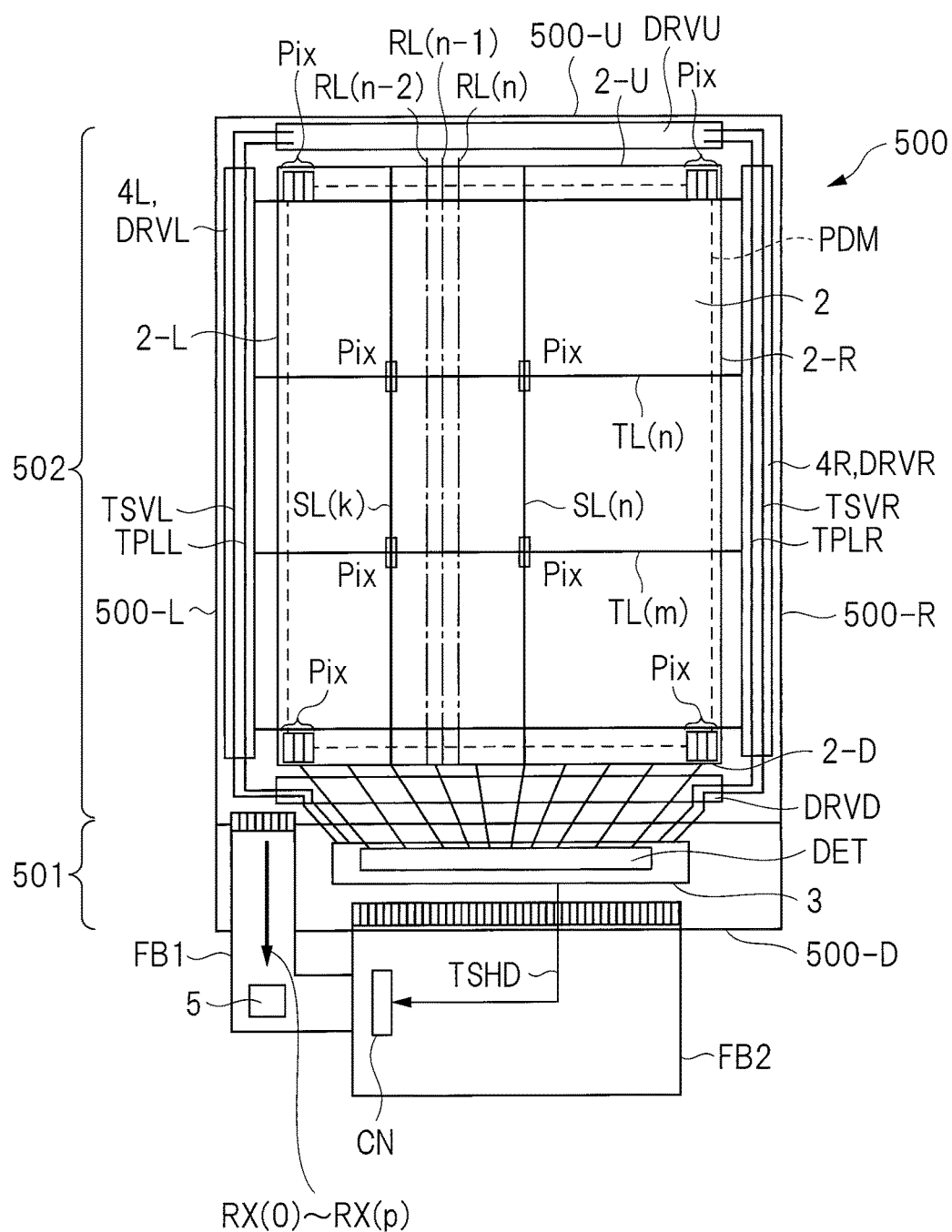
FIG. 5 is a plan view showing a configuration of a module according to a first embodiment.

FIG. 5 is a schematically plan view showing the overall configuration of a module 500 on which the display device 1 according to the first embodiment is mounted. Although schematically shown, FIG. 5 is drawn according to actual arrangement. In the Figure, reference numeral "501" shows an area of the first substrate TGB illustrated in FIGS. 1A and 1B, and reference numeral "502" shows an area in which the first substrate TGB and the second substrate CGB are laminated. In the module 500, the first substrate TGB is integrated in areas 501 and 502. In addition, in the area 502, the second substrate CGB is mounted on the first substrate TGB so that a first main surface TSF1 of the first substrate TGB and a second main surface CSF2 of the second substrate CGB face each other. In addition, in FIG. 5, reference numerals "500-U" and "500-D" denote shorter sides of the module 500, and reference numerals "500-L" and "500-R" denote longer sides of the module 500. For example, the control device 3 is the device IC. The detection circuit DET may be incorporated in the drive IC.

In a left-side frame area between the side 2-L of the display area 2 and the side 500-L of the module 500 in the area 502, the gate driver 4L and the first drive circuit DRVL shown in FIG. 4 are arranged. In a right-side frame area between the side 2-R of the display area 2 and the side 500-R of the module 500, the gate driver 4R and the first drive circuit DRVR shown in FIG. 4 are arranged. In an upper-side frame area between the side 2-U of the display area 2 and the side 500-U of the module 500, the second drive circuit DRVU shown in FIG. 4 is arranged. In a lower-side frame area between the side 2-D of the display area 2 and the side 500-D of the module 500, the second drive circuit DRVD, the detection circuit DET, and the control device 3 shown in FIG. 4 are arranged. The detection circuit DET is constituted by wirings and parts formed on the first main surface TSF1 of the first substrate TGB in the area 501. When viewed in a plan view, the control device 3 is mounted on the first substrate TGB so as to cover the detection circuit DET. In addition, wirings and parts constituting the first drive circuits DRVL and DRVR and the second drive circuits DRVU and DRVD are also formed on the first main surface TSF1 of the first substrate TGB in the area 502.

The detection signals Rx(0) to Rx(p) described in FIG. 4 are supplied to the touch control device 5 through wirings in a flexible cable FB1. A flexible cable FB2 is connected to the area 501, and signals are transmitted and received between the touch control device 5 and the control device 3 through a connector CN provided on the flexible cable FB2.

As already described, the display area 2 has a pixel array in which a plurality of pixels are arranged in a matrix, and includes the plurality of first drive electrodes TL(0) to TL(p) and the scanning line arranged along the row of the pixel array, and the plurality of signal lines SL(0) to SL(p) and the plurality of detection electrodes RL(0) to RL(p) arranged along the column of the pixel array. FIG. 5 shows, as an example, two first drive electrodes TL(n) and TL(m), two signal lines SL(k) and SL(n), and three detection electrodes RL(n−2) to RL(n). Incidentally, although the scanning line is omitted in FIG. 5, the scanning line extends parallel to the illustrated first drive electrodes TL(n) and TL(m).

In addition, in FIG. 5, the pixel array is shown as dashed line PDM. Out of the plurality of pixels arranged on the pixel array PDM, the pixels arranged at four corners of the display area 2 and the pixels arranged at crossing portions of the illustrated first drive electrodes and the signal lines are shown as Pix.

In the upper-side frame area and the lower-side frame area outside the display area 2 as already described, the second drive electrodes TL(dU) and TL(dD) as the dummy drive electrodes for generating magnetic fields extend parallel to the first drive electrodes TL(0) to TL(p) of the display area 2. When the extending direction of the first drive electrodes TL(0) to TL(p) and the second drive electrodes TL(dU) and TL(dD), that is, the lateral direction is viewed as the first direction, the first drive electrodes TL(0) to TL(p) and the second drive electrodes TL(dU) and TL(dD) are arranged in the second direction as the longitudinal direction orthogonal to (including intersecting) the first direction.

Each of the signal wirings TPLL and TSVL shown in FIG. 4 extends in the second direction in the left-side frame area. The signal wirings TPLL and TSVL include the end portions extending in the first direction in the upper-side frame area and the lower-side frame area. Similarly, each of the signal wirings TPLR and TSVR extends in the second direction in the right-side frame area. The signal wirings TPLR and TSVR include the end portions extending in the first direction in the upper-side frame area and the lower-side frame area.

<Operation of Display Device>

Figure 6:
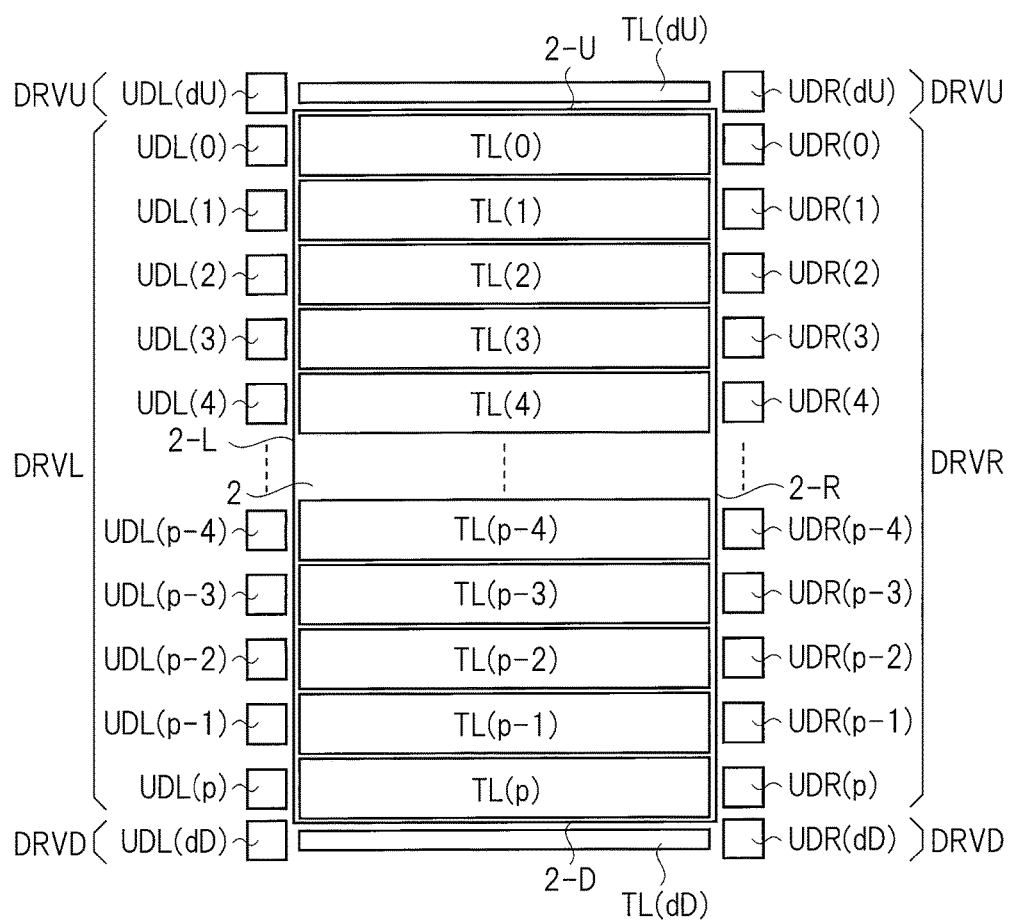
FIG. 6 is a plan view showing a configuration of a display device according a first embodiment.

The operation of the display device 1 according to the first embodiment will be described with reference to FIGS. 6 to 10. FIG. 6 is a plan view showing the configuration of the display device 1 according to the first embodiment.

In FIG. 6, "TL(0)" to "TL(p)" denote the first drive electrodes arranged parallel to each other and between the side 2-U and the side 2-D of the display area 2. In addition, "TL(dU)" denotes the second drive electrode (dummy drive electrode for generating a magnetic field) arranged in an exterior area (upper-side frame area) of the display area 2 and along the side 2-U, and "TL(dD)" denotes the second drive electrode (dummy drive electrode for generating a magnetic field) arranged in an exterior area (lower-side frame area) of the display area 2 and along the side 2-D.

In addition, in FIG. 6, each of "UDL(0)" to "UDL(p)" and "UDR(0)" to "UDR(p)" denotes a unit drive circuit. Each of the unit drive circuits UDL(0) to UDL(p) is arranged along the side 2-L of the display area 2, and the unit drive circuits UDL(0) to UDL(p) respectively correspond to the first drive electrodes TL(0) to TL(p). The unit drive circuits UDL(0) to UDL(p) are circuits constituting the first drive circuit DRVL. In addition, each of the unit drive circuits UDR(0) to UDR(p) is arranged along the side 2-R of the display area 2, and the unit drive circuits UDR(0) to UDR(p) respectively correspond to the first drive electrodes TL(0) to TL(p). The unit drive circuits UDR(0) to UDR(p) are circuits constituting the first drive circuit DRVR.

In addition, each of "UDL(dU)", "UDR(dU)", "UDL(dD)", and "UDR(dD)" denotes a unit drive circuit. Each of the unit drive circuits UDL(dU) and UDR(dU) is arranged along the side 2-U of the display area 2, and corresponds to the second drive electrode TL(dU). The unit drive circuits UDL(dU) and UDR(dU) are circuits constituting the second drive circuit DRVU. Each of the unit drive circuits UDL(dD) and UDR(dD) is arranged along the side 2-D of the display area 2, and corresponds to the second drive electrode TL(dD). The unit drive circuits UDL(dD) and UDR(dD) are circuits constituting the second drive circuit DRVD.

Figure 7:
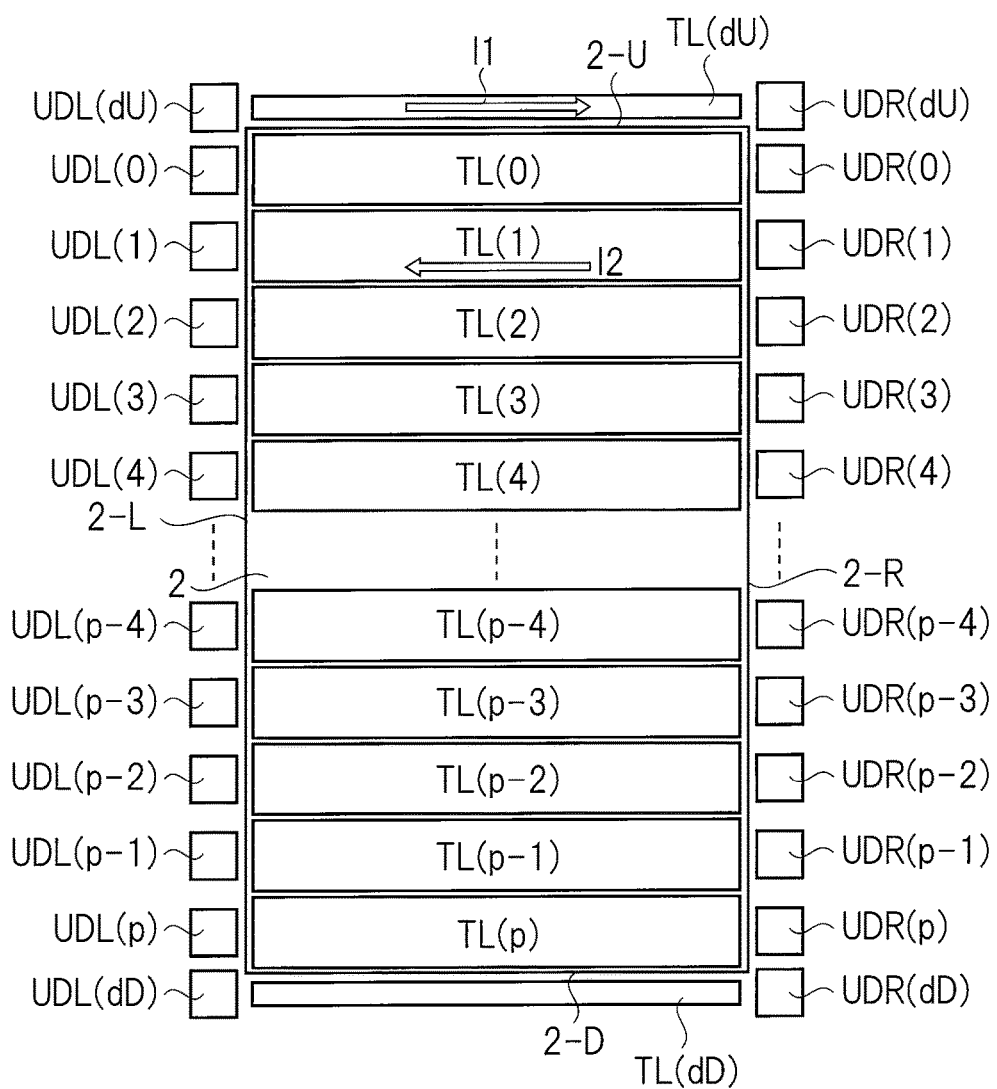
FIG. 7 is a plan view showing an operation of the display device according to the first embodiment.
Figure 8:
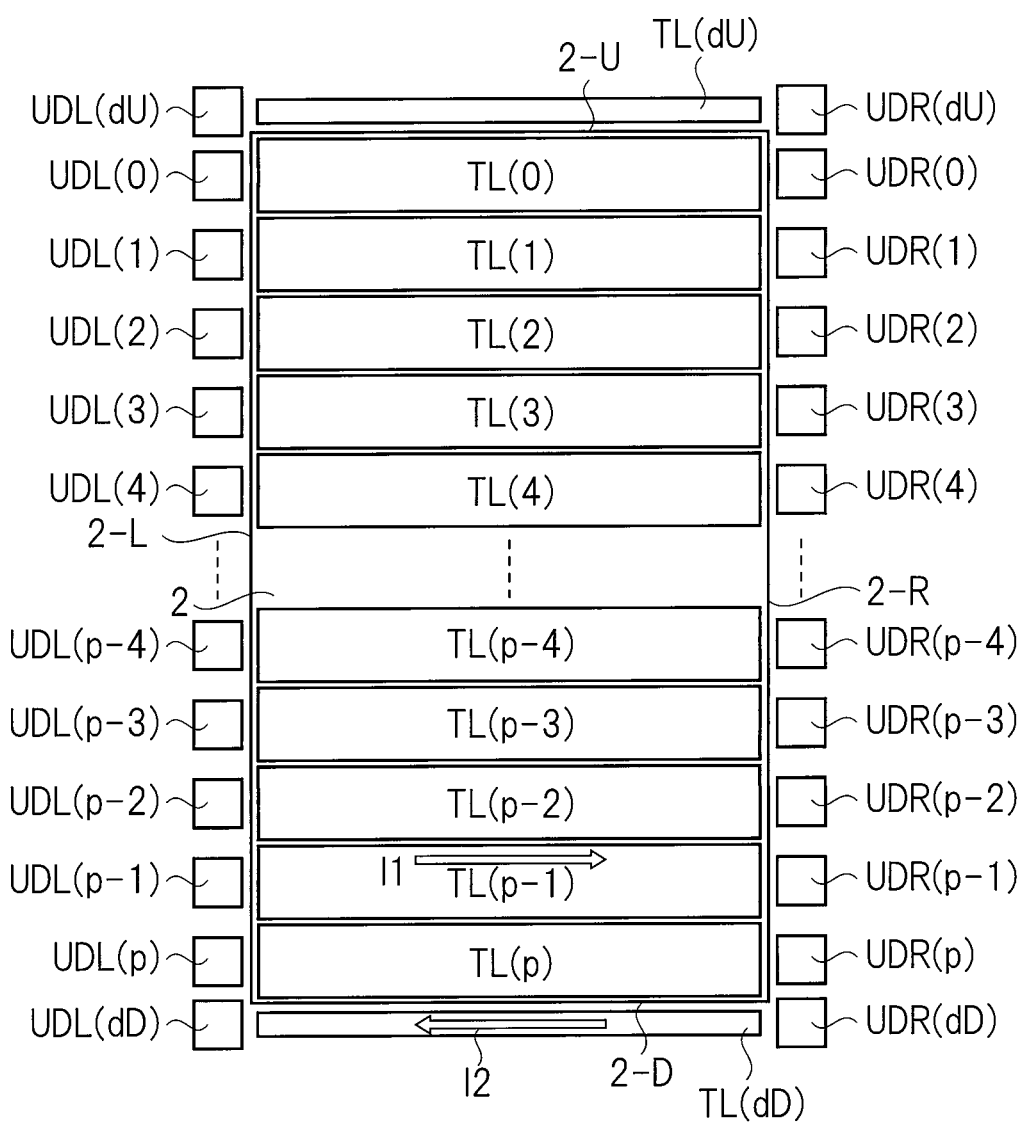
FIG. 8 is a plan view showing the operation of the display device according to the first embodiment.

FIGS. 7 and 8 are plan views showing the operation of the display device 1 according to the first embodiment. In addition, FIGS. 9 and 10 are plan views showing the configurations of the drive circuit and the drive electrode according to the first embodiment. FIGS. 7 and 9 show a case where a magnetic field is generated around the first drive electrode TL(0) arranged closest to the side 2-U of the display area 2. FIGS. 8 and 10 show a case where a magnetic field is generated around the first drive electrode TL(p) arranged closest to the side 2-D of the display area 2.

In FIGS. 9 and 10, the unit drive circuits UDL(0) to UDL(p), UDR(0) to UDR(p), UDL(dU), UDR(dU), UDL(dD), and UDR(dD) respectively include: the selection circuits SEL(0) to SEL(p), SER(0) to SER(p), SEL(dU), SER(dU), SEL(dD), and SER(dD); and a pair of switches S1L, S2L, S1R, and S2R corresponding to each of these selection circuits. The selection circuits SEL(0) to SEL(p) and SER(0) to SER(p), and the pair of switches S1L, S2L, S1R, and S2R corresponding to each of these selection circuits are the first selection circuit constituting the first drive circuits DRVL and DRVR, and the first switch. The selection circuits SEL(dU), SER(dU), SEL(dD), and SER(dD) and the pair of switches S1L, S2L, S1R, and S2R corresponding to each of these selection circuits are the second selection circuit constituting the second drive circuits DRVU and DRVD, and the second switch.

Each of the selection circuits SEL(0) to SEL(p), SER(0) to SER(p), SEL(dU), SER(dU), SEL(dD), and SER(dD) switches the switches S1L, S2L, S1R, and S2R corresponding to each selection circuit by using the selection signal, and selects the corresponding first drive electrodes TL(0) to TL(p) and second drive electrodes TL(dU) and TL(dD). Each of the switches S1L, S2L, S1R, and S2R corresponding to each selection circuit becomes an on-state by the selection signal from the corresponding selection circuit.

The switches S1L corresponding to the selection circuits SEL(0) to SEL(p), SEL(dU), and SEL(dD) become on-states by the selection signals, and so connect the signal wiring TPLL and the one end portions n1 of the corresponding first drive electrodes TL(0) to TL(p) and second drive electrodes TL(dU) and TL(dD). The switches S2L corresponding to the selection circuits SEL(0) to SEL(p), SEL(dU), and SEL(dD) become on-states the selection signals, and so connect the signal wiring TSVL and the one end portions n1 of the corresponding first drive electrodes TL(0) to TL(p) and second drive electrodes TL(dU) and TL(dD).

The switches S1R corresponding to the selection circuits SER(0) to SER(p), SER(dU), and SER(dD) become on-states by the selection signals, and so connect the signal wiring TPLR and the other end portions n2 of the corresponding first drive electrodes TL(0) to TL(p) and second drive electrodes TL(dU) and TL(dD). The switches S2R corresponding to the selection circuits SER(0) to SER(p), SER(dU), and SER(dD) become on-states by the selection signals, and so connect the signal wiring TSVR and the other end portions n2 of the corresponding first drive electrodes TL(0) to TL(p) and second drive electrodes TL(dU) and TL(dD) by being turned on.

In the first embodiment, the drive signal TPL supplied to the signal wirings TPLL and TPLR is a DC voltage. The drive signal TPL of this DC voltage is a signal of a first voltage Vs such as a ground voltage. In addition, the drive signal TSV supplied to the signal wirings TSVL and TSVR is an AC voltage. The drive signal TSV of this AC voltage is a signal alternately oscillating between the first voltage Vs such as the ground voltage and a second voltage Vd higher than the first voltage Vs.

FIGS. 7 and 9 are plan views showing a case where a magnetic field is generated around the first drive electrode TL(0) arranged closest to the side 2-U of the display area 2. In the magnetic field generation period, the two drive electrodes of the second drive electrode TL(dU) and the first drive electrode TL(1) arranged apart from each other so as to sandwich the first drive electrode TL(0) corresponding to the area where a magnetic field is generated are selected by the corresponding unit drive circuits UDL(dU), UDR(dU), UDL(1), and UDR(1).

At this time, each unit drive circuit is controlled so that currents flowing through the second drive electrode TL(dU) and the first drive electrode TL(1) are opposite each other. Therefore, a magnetic field can be generated about an area sandwiched between the second drive electrode TL(dU) and the first drive electrode TL(1).

That is, at this time, the magnetic field generation coil described with reference to FIGS. 2A to 2C can be considered to be constituted by the second drive electrode TL(dU) and the first drive electrode TL(1). In FIGS. 2A to 2C, the drive electrodes arranged apart from each other are connected in series at any one of their end portions to form a looped coil. But, even if the second drive electrode TL(dU) and the first drive electrode TL(1) arranged parallel to each other are not directly electrically connected, the currents flow in directions opposite to each other, and thereby a strong magnetic field can be formed as shown in FIG. 7. In this display device, batteries are not necessary for the pen, and detection sensitivity in a display area plane is uniform.

The unit drive circuit UDL(dU) turns on the switch S2L by the selection signal of the selection circuit SEL(dU) to connect the selected second drive electrode TL(dU) to the signal wiring TSVL. Similarly the unit drive circuit UDR (dU) turns on the switch S1R by using the selection signal of the selection circuit SER(dU) to connect the selected second drive electrode TL(dU) to the signal wiring TPLR. The second voltage Vd from the signal wiring TSVL is supplied to the one end portion n1 of the selected second drive electrode TL(dU), and the first voltage Vs from the signal wiring TPLR is supplied to the other end portion n2. In FIG. 9, the second voltage Vd is denoted by "+", and the first voltage Vs is denoted by "0".

At the same time, the unit drive circuit UDR(1) turns on the switch S2R by the selection signal of the selection circuit SER(1) to connect the selected first drive electrode TL(1) to the signal wiring TSVR. Similarly, the unit drive circuit UDL(1) turns on the switch S1L by the selection signal of the selection circuit SEL(1) to connect the selected first drive electrode TL(1) to the signal wiring TPLL. The second voltage Vd from the signal wiring TSVR is supplied to the other end portion n2 of the selected first drive electrode TL(1), and the first voltage Vs from the signal wiring TPLL is supplied to the one end portion n1.

Thus, a current I1 indicated by an arrow flows through the second drive electrode TL(dU) from its one end portion n1 to the other end portion n2 due to a voltage difference, and a magnetic field ϕ1 is generated. At the same time, a current I2 indicated by an arrow flows through the first drive electrode TL(1) from its other end portion n2 to the one end portion n1 due to a voltage difference, and a magnetic field ϕ2 is generated. The magnetic field ϕ1 generated around the second drive electrode TL(dU) and the magnetic field ϕ2 generated around the first drive electrode TL(1) are superimposed in the area of the first drive electrode TL(0), and so a strong magnetic field can be generated in the area of the first drive electrode TL(0). As a result, when the magnetic field is generated about the first drive electrode TL(0) arranged closest to the side 2-U of the display area 2, a magnetic field having almost the same intensity as that of the magnetic field generated near the center of the display area 2, for example near the first drive electrode TL(4) etc. can be generated.

Thus, when the magnetic field is generated in the display device and the pen incorporating the coil and the capacitive element is close to the display area of the display device, the capacitive element of the coil is charged to generate a magnetic field, and by detecting this magnetic field with, for example, the detection electrode(s) RL arranged in the display device, presence/absence of the pen and its coordinates can be calculated.

FIGS. 8 and 10 are plan views showing a case where a magnetic field is generated around the first drive electrode TL(p) arranged closest to the side 2-D of the display area 2. In the magnetic field generation period, the two drive electrodes of the first drive electrode TL(p−1) and the second drive electrode TL(dD) arranged so as to sandwich the first drive electrode TL(p) corresponding to the area where a magnetic field is generated are selected by the corresponding unit drive circuits UDL(p−1), UDR(p−1), UDL(dD), and UDR(dD).

The unit drive circuit UDL(p−1) turns on the switch S2L by the selection signal of the selection circuit SEL(p−1) to connect the selected first drive electrode TL(p−1) to the signal wiring TSVL. Similarly, the unit drive circuit UDR (p−1) turns on the switch S1R by the selection signal of the selection circuit SER(p−1) to connect the selected first drive electrode TL(p−1) to the signal wiring TPLR. The second voltage Vd from the signal wiring TSVL is supplied to the one end portion n1 of the selected first drive electrode TL(p−1), and the first voltage Vs from the signal wiring TPLR is supplied to the other end portion n2. In FIG. 10, the second voltage Vd is denoted by "+", and the first voltage Vs is denoted by "0".

At the same time, the unit drive circuit UDR(dD) turns on the switch S2R by the selection signal of the selection circuit SER(dD) to connect the selected second drive electrode TL(dD) to the signal wiring TSVR. Similarly, the unit drive circuit UDL(dD) turns on the switch S1L by the selection signal of the selection circuit SEL(dD) to connect the selected second drive electrode TL(dD) to the signal wiring TPLL. The second voltage Vd from the signal wiring TSVR is supplied to the other end portion n2 of the selected second drive electrode TL(dD), and the first voltage Vs from the signal wiring TPLL is supplied to the one end portion n1.

Thus, a current I1 indicated by an arrow flows through the first drive electrode TL(p−1) from its one end portion n1 to the other end portion n2 due to a voltage difference, and a magnetic field ϕ1 is generated. At the same time, a current I2 indicated by an arrow flows through the second drive electrode TL(dD) from its other end portion n2 to the one end portion n1 due to a voltage difference, and a magnetic field ϕ2 is generated. The magnetic field ϕ1 generated around the first drive electrode TL(p−1) and the magnetic field ϕ2 generated around the second drive electrode TL(dD) are superimposed in the area of the first drive electrode TL(p), and so a strong magnetic field can be generated in the area of the first drive electrode TL(p). As a result, when the magnetic field is generated about the first drive electrode TL(p) arranged closest to the side 2-D of the display area 2, a magnetic field having almost the same intensity as that of the magnetic field generated bout the drive electrode near the center of the display area 2 can be generated.

In the first embodiment, by arranging the second drive electrodes TL(dU) and TL(dD) in the frame area, an area whose detection accuracy deteriorates in the display area 2 (detection area) is reduced, and detection sensitivity in the end portion and the center of the display area 2 can be made uniform. For example, if the second drive electrodes TL(dU) and TL(dD) in the frame area are not arranged, and when a magnetic field is generated around the first drive electrode TL(0) arranged close to the side 2-U of the display area 2, the drive electrode close to the first drive electrode TL(0) is only the first drive electrode TL(1), and so only the first drive electrode TL(1) is selected. However, as described above, in order to generate a strong magnetic field, it is necessary to simultaneously select a pair of drive electrodes arranged apart from each other, and to make currents flow in directions opposite to each other. Therefore, the magnetic field generated by only one drive electrode weakens. Similarly, when a magnetic field about the first drive electrode TL(p) arranged close to the side 2-D of the display area 2 is generated, since the drive electrode in close proximity to the first drive electrode TL(p) is only the first drive electrode TL(p−1), and so the magnetic field generated about the first drive electrode TL(p) weakens.

On the other hand, when a magnetic field is generated near the center of the display area 2, for example, about the first drive electrode TL(4) etc., the drive electrodes TL(3) and TL (5) paired between which the first drive electrode TL(4) is sandwiched are simultaneously selected, and so a difference in the intensity between the magnetic fields generated around the end portion and the center of the display area 2 is large, and the touch detection sensitivity becomes non-uniform.

<Circuit Arrangement of Display Device>

Figure 11:
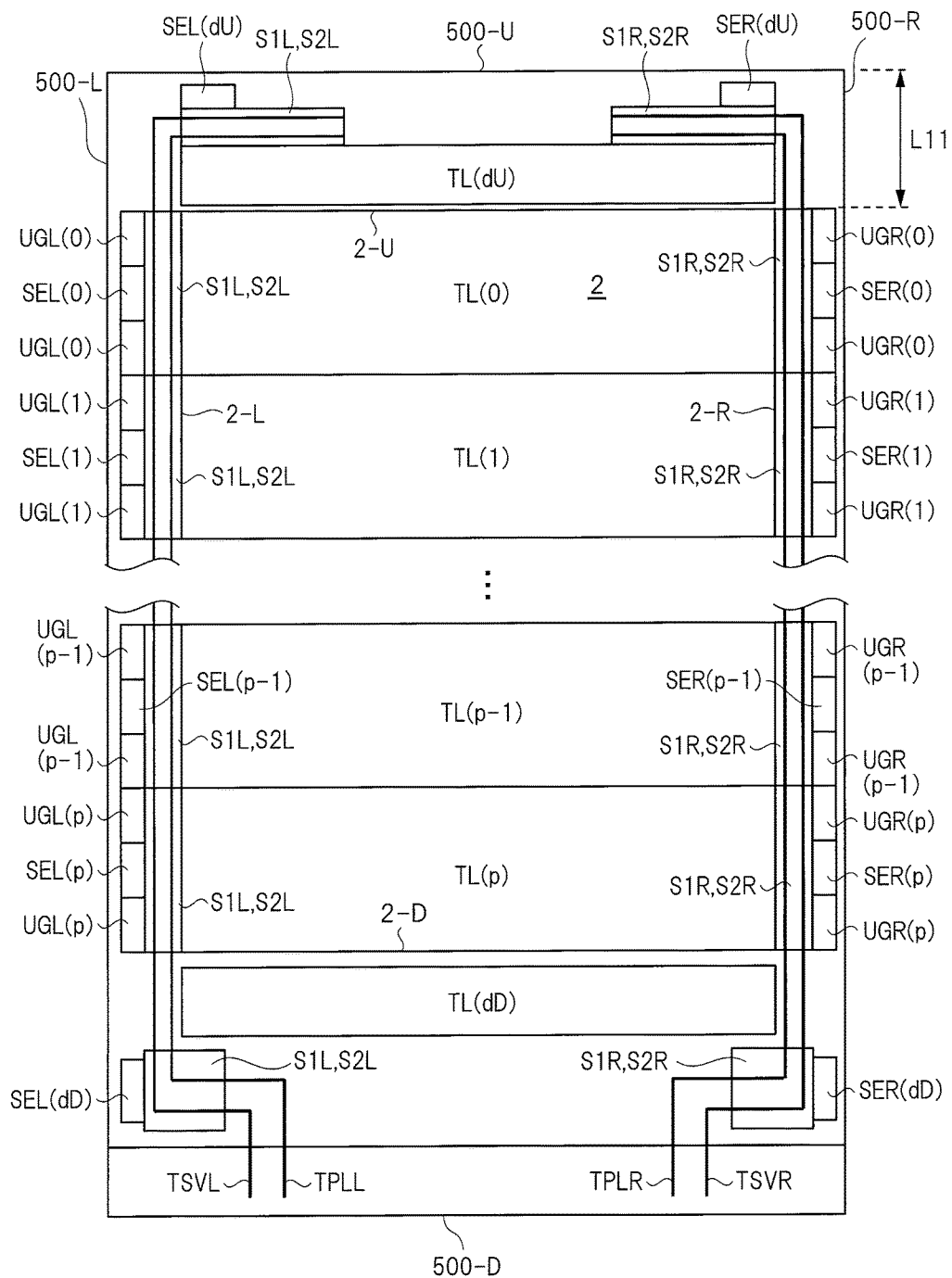
FIG. 11 is a plan view showing circuit arrangement of the display device according to the first embodiment.
Figure 12:
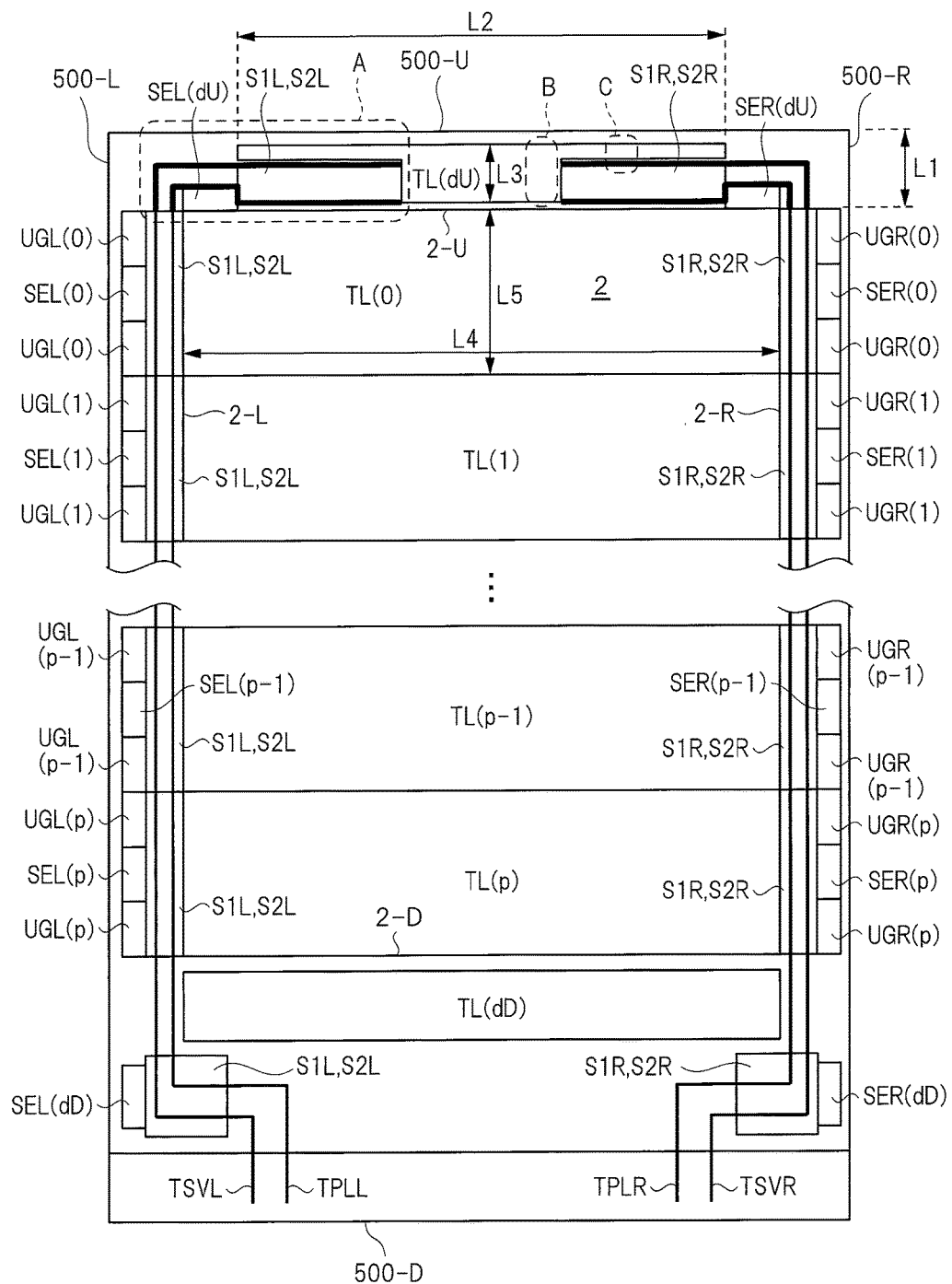
FIG. 12 is a plan view showing circuit arrangement of a display device according to a modification with respect to the first embodiment.

FIGS. 11 and 12 are diagrams for describing circuit arrangement of the display device 1, and FIG. 11 of these is a plan view showing circuit arrangement of the display device 1 according to the first embodiment, and FIG. 12 is a plan view showing circuit arrangement of the display device 1 according to a modification. First, circuit arrangement of the display device 1 according to the first embodiment will be described. FIG. 11 is a plan view showing circuit arrangement of a display device according to the first embodiment.

In FIG. 11, the first drive electrodes TL(0) to TL(p) extend in the lateral direction (first direction) and are arranged parallel to the longitudinal direction (second direction) in the display area 2. In addition, the second drive electrode TL(dU) extends in the lateral direction to be arranged in the upper-side frame area outside the display area 2, and the second drive electrode TL(dD) extends in the lateral direction to be arranged in the lower-side frame area outside the display area 2.

In addition, in FIG. 11, the selection circuits SEL(0) to SEL(p) constituting the unit drive circuits UDL(0) to UDL (p) and a pair of switches S1L and S2L corresponding to each of these selection circuits are respectively arranged at positions corresponding to the first drive electrodes TL(0) to TL(p) along the longitudinal direction in the left-side frame area outside the display area 2. The selection circuits SER(0) to SER(p) constituting the unit drive circuits UDR(0) to UDR(p) and a pair of switches S1R and S2R corresponding to each of these selection circuits are respectively arranged at positions corresponding to the first drive electrodes TL(0) to TL(p) along the longitudinal direction in the right-side frame area outside the display area 2. It should be noted that unit gate drivers UGL(0) to UGL(p) and UGR(0) to UGR(p) corresponding to the respective first drive electrodes TL(0) to TL(p) are also arranged in the left-side frame area and the right-side frame area outside the display area 2.

In addition, in FIG. 11, the selection circuits SEL(dU) and SER(dU) constituting the unit drive circuits UDL(dU) and UDR(dU) and a pair of switches S1L, S2L, S1R, and S2R corresponding to each of these selection circuits are each arranged along the lateral direction in the upper-side frame area outside the display area 2. The selection circuits SEL (dD) and SER(dD) constituting the unit drive circuits UDL (dD) and UDR(dD) and a pair of switches S1L, S2L, S1R, and S2R corresponding to each of these selection circuits are each arranged along the lateral direction in the lower-side frame area outside the display area 2.

In the display device according to the first embodiment shown in FIG. 11, the second drive electrode TL(dU) is arranged closest to the side 2-U of the display area 2 in the upper-side frame area outside the display area 2, the switches S1L and S2L, and switches S1R and S2R are each arranged above the second drive electrode TL(dU) (in the direction of the side 500-U of the module 500); and the selection circuits SEL(dU) and SER(dU) are respectively arranged further on the switches S1L and S2L, and switches S1R and S2R. According to such arrangement, a length L11 between the side 2-U of the display area 2 and the side 500-U of the module 500 becomes longer, and this is a factor of the increase in the upper-side frame area.

That is, in the display device 1 according to the first embodiment, when the touch detection of the electromagnetic induction method is performed with the in-cell type display device, second drive electrodes (dummy drive electrodes for generating a magnetic field) TL(dU) and TL(dD) are arranged, as auxiliary electrodes for generating a magnetic field around the end portions of the display area 2, in the upper-side frame area and the lower-side frame area on the periphery of the display area 2. In this case, a drive circuit for driving the second drive electrode TL(dU) arranged in the upper-side frame area has to be arranged in the upper-side frame area, and this is a factor of an increase in the upper-side frame area.

Thus, in a case of the in-cell type display device, the modification has an improvement as shown in FIG. 12 in order to provide a display device including an input detection device for suppressing an increase in the upper-side frame area. FIG. 12 is a plan view showing circuit arrangement of the display device 1 according to the modification. In a description of FIG. 12, differences from the display device according to the first embodiment shown in FIG. 11 will mainly be described.

In the modification, as shown in FIG. 12, a shape and a size of the second drive electrode TL(dU) in the upper-side frame area is devised, and the arrangement of the selection circuits SEL(dU) and SER(dU) and the switches S1L, S2L, S1R, and S2R for driving the second drive electrode TL(dU) is devised. The second drive electrode TL(dU) is shorter in the lateral-directional length and the longitudinal-directional length than the first drive electrodes TL(0) to TL(p) when seen in a plan view. In FIG. 12, the second drive electrode TL(dU) is indicated by the lateral-directional length L2 and the longitudinal-directional length L3, and the first drive electrodes TL(0) to TL(p) are indicated by the lateral-directional length L4 and the longitudinal-directional length L5, where the length L2 is shorter than the length L4 and the length L3 is shorter than the length L5. Furthermore, the second drive electrode TL(dU) has a convex shape having a downward protrusion formed by cutting out a lower-left corner and a lower-right corner of a rectangle when seen in a plan view. The switches S1L and S2L and the switches S1R and S2R are respectively arranged at a lower-left corner portion and a lower-right corner portion cut out of the convex shape of the second drive electrode TL(dU). In addition, the selection circuit SEL(dU) and the selection circuit SER(dU) are respectively arranged at empty left and right portions obtained by shortening the lateral-directional length of the second drive electrode TL(dU).

That is, the selection circuit SEL(dU) and the switches S1L and S2L are arranged in a space formed by the cut-out etc. so as to narrow a width of a part of the second drive electrode TL(dU), and so the second drive electrode TL(dU) is sandwiched and located so as to be arranged in the lateral direction (part A in Figure) in the upper-side frame area outside the display area 2. In addition, a portion in which neither the selection circuit SEL(dU) and the switches S1L and S2L nor the selection circuit SER(dU) and the switches SIR and S2R are present in the second drive electrode TL(dU) makes its longitudinal-directional length long (a length of a protrusion part in the convex shape, part B in Figure). In addition, the upper parts of the switches S1L and S2L and the switches S1R and S2R in the second drive electrode TL(dU) make their longitudinal-directional lengths short (a length of a base part of the convex shape, part C in Figure). Since these parts are only needed to play a role in drawing out any wirings from the switches y1L and S2L, and the switches S1R and S2R to the second drive electrode TL(dU), the part may have short lengths. It should be noted that "long" or "short" in a plan view can be also reworded as "thick" or "thin" from the viewpoint of a plan view and a cross-sectional view.

Since the second drive electrode TL(dU) is arranged in the frame area and performs neither the display operation nor the electric field generation operation, the second drive electrode TL(dU) does not need to have the same pattern and/or wiring width as the first drive electrode, so that the second drive electrode TL(dU) may have a wiring width thinner than that of the first drive electrode, or may have a pattern shape including a cut-out portion and the like.

In addition, since arranged in the frame area and not visually recognized, the second drive electrode TL(dU) may be formed of a light-shielding metallic material or the like. The second drive electrode TL(dU) in the upper-side frame area has a smaller width, length, and area than each of the first drive electrodes TL(0) to TL(p) in the display area 2. But, when the first drive electrode is formed of a transparent electrode made of ITO etc. and the second drive electrode is formed of a metallic material lower in resistance than ITO, the same amount of currents as that of currents flowing through the first drive electrodes TL(0) to TL(p) of the display area 2 can be set to flow through the second drive electrode. For example, the second drive electrode TL(dU) can be formed of Ti (titanium), AL (aluminum), or the like.

In addition, by taking into account a magnetic field generated by currents flowing also through the signal wirings TPLL and TSVL and the signal wirings TPLR and TSVR themselves, the present embodiment is designed so as to carry a current having a current value required for a total of the second drive electrode TL(dU), the signal wirings TPLL and TSVL, and the signal wirings TPLR and TSVR. That is, the signal wirings TPLL and TSVL and the signal wirings TPLR and TSVR include the part (part A in the figure) extending in the extending direction of the first drive electrode in the upper-side frame area, that is, in the direction along the side 2-U, and these signal wirings can also be used as the auxiliary wirings for generating a magnetic field. Thus, a total amount of currents flowing through the signal wirings TPLL and TSVL, the signal wirings TPLR and TSVR, and the second drive electrode TL(dU) can be made equal to an amount of currents flowing per one of the first drive electrodes TL(0) to TL(p) of the display area 2. "Being made equal" also includes, for example, being within a predetermined range such as a range between 0.8 times and 1.2 times of the amount of currents flowing per one of the first drive electrodes. In this way, a magnetic field having the same intensity as that of the first drive electrode can be generated by using the second electrode whose area is smaller than that of the first drive electrode and whose electrode width is not constant.

Thus, in the display device 1 according to the modification embodiment shown in FIG. 12, the selection circuit SEL(dU) and the switches S1L and S2L, and the selection circuit SER(dU) and the switches S1R and S2R together with the second drive electrode TL(dU) can be each placed so as to be arranged along the side 2-U of the display area 2 in the upper-side frame area outside the display area 2. According to this placement, the length L1 between the side 2-U of the display area 2 and the side 500-U of the module 500 becomes shorter than the length L11 of the first embodiment shown in FIG. 11, and the increase in the upper-side frame area can be suppressed. As a result, the frame in the upper-side frame area can be narrowed.

Incidentally, since the lower-side frame area outside the display area 2 is assumed to be relatively wide and has a space for arranging the selection circuit SEL(dU) and the switches S1L and S2L, and the selection circuit SER(dU) and the switches S1R and S2R, the lower-side frame area has the same arrangement as that of the first embodiment shown in FIG. 11. The present invention is not limited to this, and the lower side may have the same arrangement as the upper side of the modification. In addition, only the lower side may have the same arrangement as the upper side of the modification, and the upper side may retain the same arrangement as the lower side of the first embodiment.

<Effect>

According to the display device 1 of the first embodiment, a display device with input detection device of the electromagnetic induction method having uniform detection sensitivity in the display area can be provided. Also, according to the display device 1 of the modification, the display device 1 with an input detection device of the electromagnetic induction method for suppressing the increase in the upper-side frame area outside the display area 2 can be provided. In particular, by devising the arrangement of the second drive electrode TL(dU), the selection circuits SEL (dU) and SER(dU), the switches S1L, S2L, S1R, and S2R, and the signal wirings TPLL, TSVL, TPLR, and TSVR in the upper-side frame area outside the display area 2 as the modification, desired magnitude of magnetic fields can be generated around the frame area even if the second drive electrode having an area smaller than the first drive electrode of the display area is used.

Second Embodiment

Figure 13:
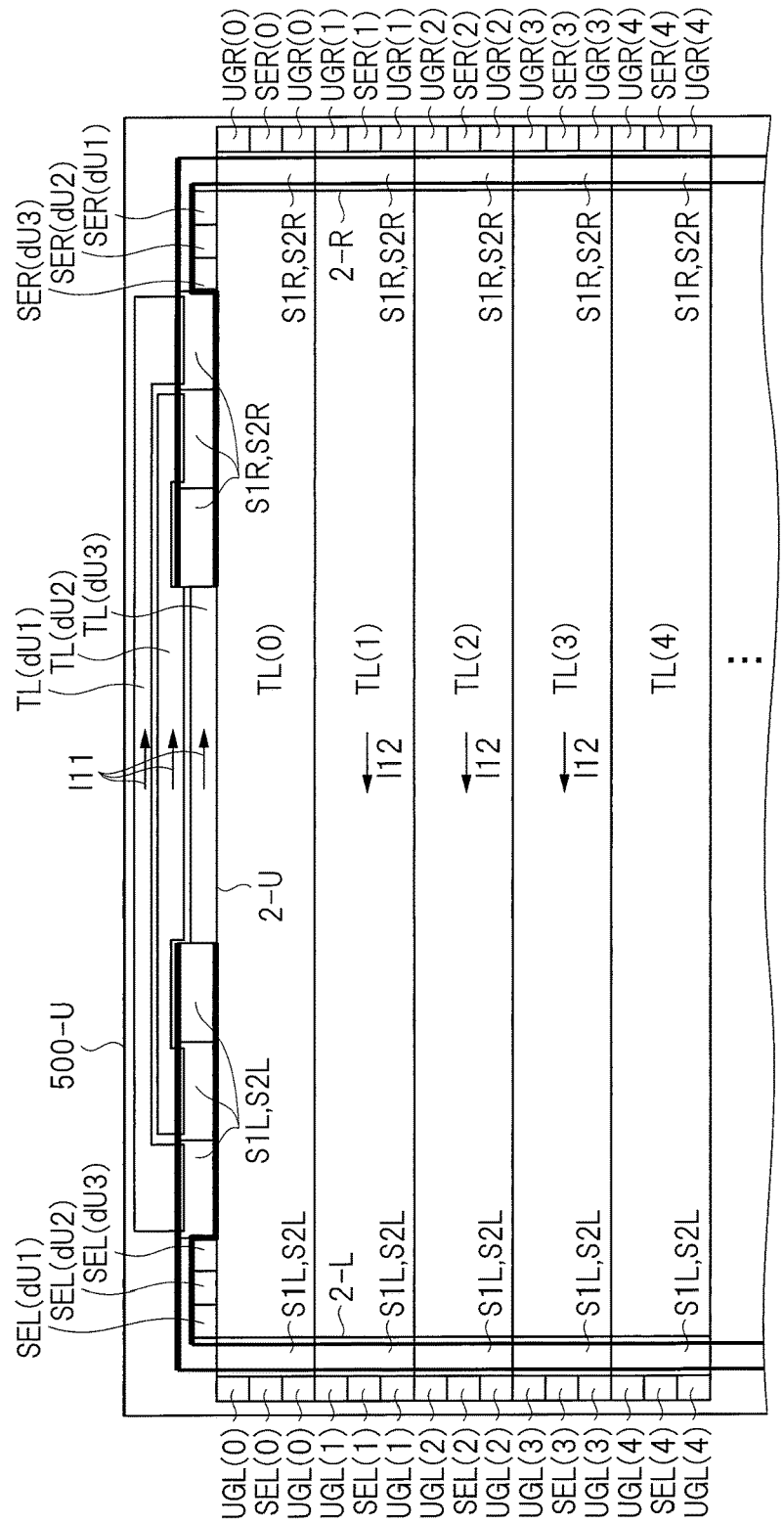
FIG. 13 is a plan view showing a configuration and an operation of a display device according to a second embodiment.
Figure 14:
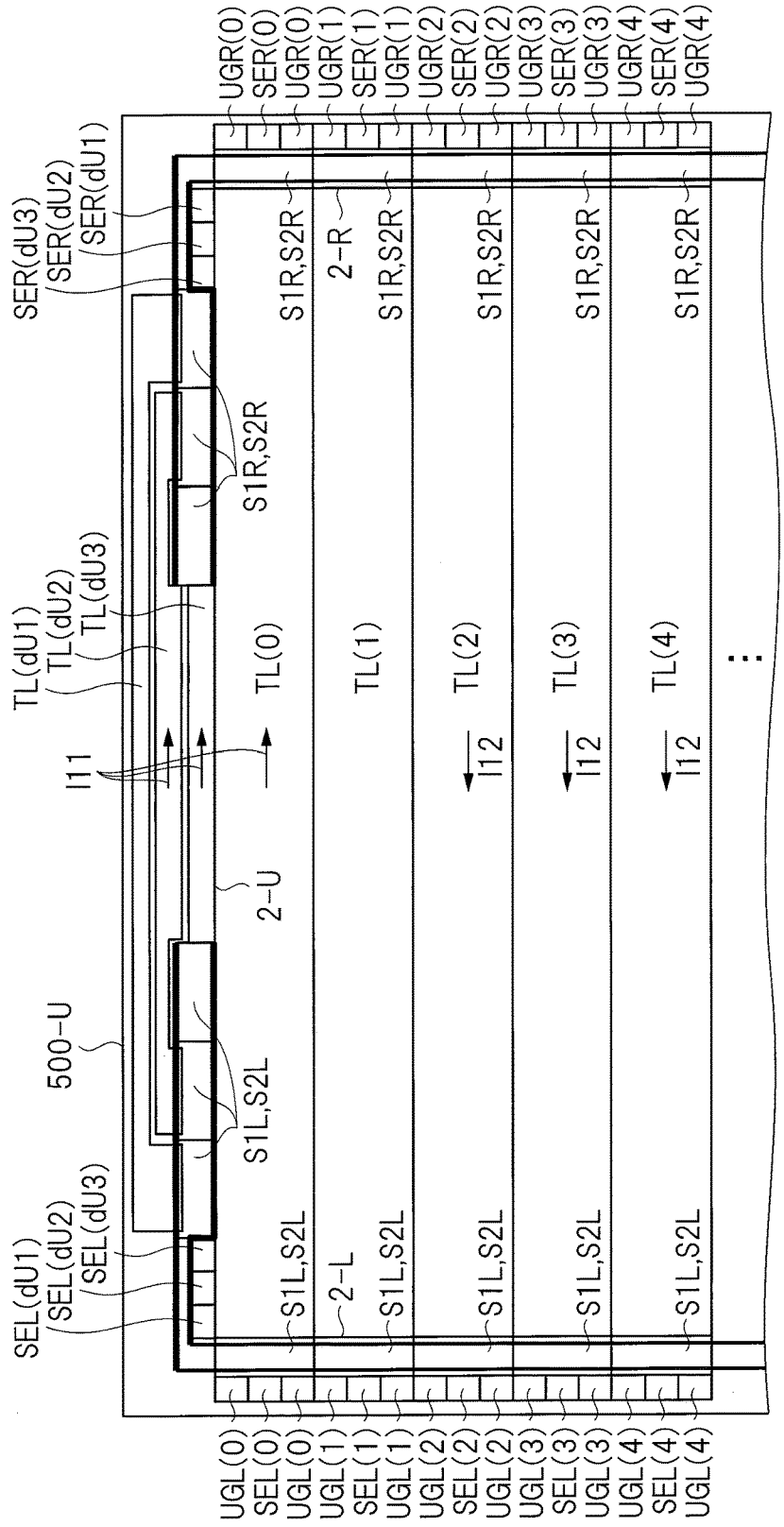
FIG. 14 is a plan view showing a configuration and an operation of a display device according to a second embodiment.
Figure 15:
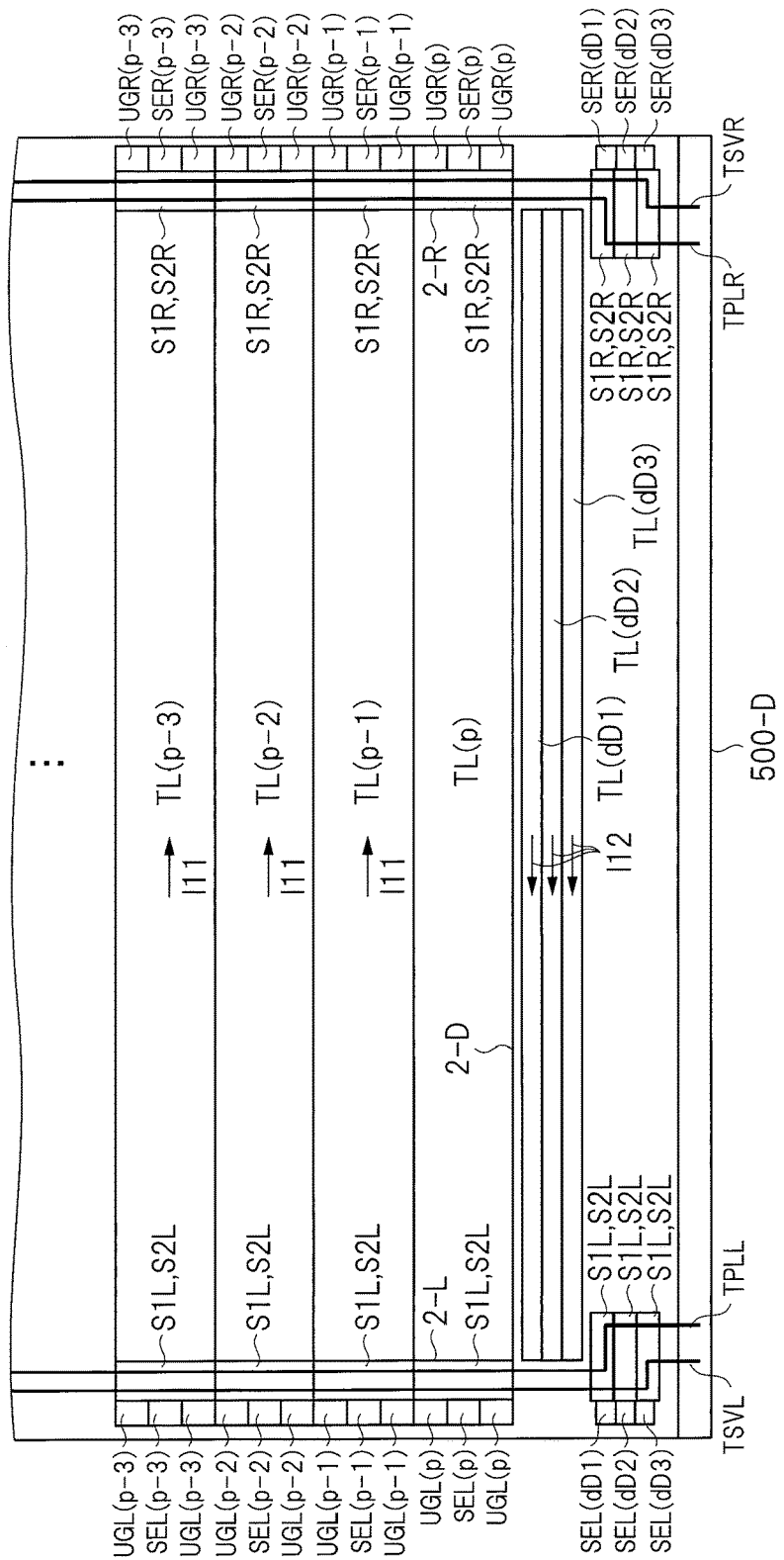
FIG. 15 is a plan view showing a configuration and an operation of a display device according to a second embodiment.

The display device 1 according to a second embodiment will be described with reference to FIGS. 13 to 15. FIGS. 13 to 15 are plan views showing a configuration and an operation of the display device 1 according to the second embodiment. In the second embodiment, differences from the above-described first embodiment will mainly be described.

In the first embodiment, one second drive electrode TL(dU) is placed in the upper-side frame area on the periphery of the display area 2, and one second drive electrode TL(dD) is placed in the lower-side frame area. In contrast to this, in the second embodiment, in order to apply a concept of driving a plurality of drive electrodes by regarding them as a bundle, as shown in FIGS. 13 to 15, three second drive electrodes TL(dU1) to TL(dU3) are arranged in the upper-side frame area on the periphery of the display area 2, and three second drive electrodes TL(dD1) to TL(dD3) are arranged in the lower-side frame area.

In the magnetic field generation period, when the plurality of drive electrodes are driven as a bundle in order to increase the intensity of a magnetic field to be generated, one set of the plurality of drive electrodes and the other set of the plurality of drive electrodes arranged so as to sandwich the area of the non-selected drive electrode serving as a center of a magnetic field to be generated are simultaneously selected, and are driven so that the directions of the currents flowing through the selected one set of the plurality of drive electrodes and the selected other set of the plurality of drive electrodes are opposite each other.

In this case, the second drive electrodes having the same number as that of the first drive electrodes TL bundled in the display area 2 are desirably arranged in the frame area. This reason is as follows: when each of the paired drive electrodes include, for example, a bundle of n electrodes, a magnetic field is considered to be generated about the endmost first drive electrode of the display area 2 in order to make the magnetic field generated in the display area uniform; n auxiliary electrodes are needed in the frame area; (n−1) auxiliary electrodes are needed in the frame area when a magnetic field is generated about the second first drive electrode next to the endmost first drive electrode; and (n−2) auxiliary electrodes are needed in the frame area when a magnetic field is generated about the third first drive electrode from the endmost first drive electrode.

FIG. 13 shows a case where two bundles each having adjacent three first drive electrodes (hereinafter also referred to as "bundle drive electrode") sandwich the non-selected first drive electrode TL(0) therebetween and become paired, and a magnetic field is generated about the area of the first drive electrode TL(0). At this time, the bundle drive electrode including the second drive electrodes TL(dU1) to TL(dU3) arranged in the upper-side frame area and the bundle drive electrode including the first drive electrodes TL(1) to TL(3) arranged in the display area sandwich the first drive electrode TL(0) therebetween and are simultaneously selected.

In the magnetic field generation period, the currents I11 indicated by the arrows flow through the second drive electrodes TL(dU1) to TL(dU3) from their one end portions to the other end portions due to the voltage differences, and magnetic fields are generated. At the same time, the currents I12 indicated by the arrows flow through the first drive electrodes TL(1) to TL(3) from their other end portions to the one end portions due to the voltage differences, and magnetic fields are generated. The magnetic fields generated around the second drive electrodes TL(dU1) to TL(dU3) and the magnetic fields generated around the first drive electrodes TL(1) to TL(3) are superimposed in the area of the first drive electrode TL(0), and so a strong magnetic field can be generated in the area of the first drive electrode TL(0). As a result, a magnetic field having almost the same intensity as that of the magnetic field generated about the first drive electrode near the center of the display area 2 can be generated about the first drive electrode TL(0) arranged closest to the side 2-U of the display area 2.

In the next magnetic field generation period following FIG. 13, the drive electrode to be a center of the magnetic field generation is shifted by one position in its adjacent direction, and as shown in FIG. 14, the second drive electrodes TL(dU2) to TL(dU3) arranged in the upper-side frame area and the first drive electrode TL(0) placed in the display area are set as a bundle to constitute the bundle drive electrodes, and the first drive electrodes TL(2) to TL(4) arranged in the display area are set as a bundle to constitute the bundle drive electrodes. In this magnetic field generation period, the currents I11 indicated by the arrows flow through the second drive electrodes TL(dU2) to TL(dU3) and the first drive electrode TL(0) and generate the magnetic fields; the currents I12 indicated by the arrows flow through the first drive electrodes TL(2) to TL(4) and generate a magnetic field at the same time; and these magnetic fields are superimposed in the area of the first drive electrode TL(1), so that the strong magnetic field can be generated in the area of the first drive electrode TL(1).

Thereafter, the drive electrode to be the center of the magnetic field generation is sequentially shifted. In the magnetic field generation period when the magnetic field generation is performed about the drive electrode located at the lowest end portion of the display area 2, as shown in FIG. 15, the first drive electrodes TL(p−3) to TL(p−1) arranged in the display area are set as a bundle to constitute the bundle drive electrode, and the second drive electrodes TL(dD1) to TL(dD3) arranged in the lower-side frame area are set as a bundle to constitute the bundle drive electrodes. In this magnetic field generation period, the currents I11 indicated by the arrows flow through the first drive electrodes TL(p−3) to TL(p−1) to generate a magnetic field; simultaneously the currents I12 indicated by the arrows flow through the second drive electrodes TL(dD1) to TL(dD3) to generate a magnetic field; and these magnetic fields are superimposed in the area of the first drive electrode TL(p), so that a strong magnetic field can be generated in the area of the first drive electrode TL(p). As a result, a magnetic field having almost the same intensity as that of the magnetic field generated about the first drive electrode arranged near the center of the display area 2 can be generated about the first drive electrode TL(p) arranged closest to the side 2-D of the display area 2.

In the second embodiment, by arranging the second drive electrodes TL(dU1) to TL(dU3) and TL(dD1) to TL(dD3) in the frame area, the area whose detection accuracy decreases can be reduced in the display area 2 (detection area). In addition, since the three drive electrodes are driven as a bundle, the second embodiment can generate the magnetic field much stronger than the first embodiment.

Similarly to the modification also regarding the circuit arrangement of the display device 1 in the second embodiment, as shown in FIG. 13, each shape and size of the second drive electrodes TL(dU1) to TL(dU3) in the upper-side frame area are devised, and the arrangement of the selection circuits SEL(dU1) to SEL(dU3) and SER(dU1) to SER (dU3) and the switches S1L, S2L, S1R, and S2R for driving the second drive electrodes TL(dU1) to TL(dU3) is devised. The second drive electrodes TL(dU1) to TL(dU3) are shorter in the lateral-directional lengths (the length of the electrode) and the longitudinal-directional lengths (the width of the electrode) than the first drive electrodes TL(0) to TL(p) when seen in a plan view. Furthermore, the second drive electrodes TL(dU1) to TL(dU3) each have a predetermined shape formed by, for example, cutting out etc. a predetermined portion of a rectangle when viewed in a plan view. The switches S1L and S2L and the switches S1R and S2R are placed at the portions cut out etc. of the shapes of the second drive electrodes TL(dU1) to TL(dU3). In addition, the selection circuits SEL(dU1) to SEL(dU3) and the selection circuits SER(dU1) to SER(dU3) are respectively placed at the empty left and right portions obtained by shortening the lateral-directional lengths of the second drive electrodes TL(dU1) to TL(dU3).

That is, the selection circuits SEL(dU1) to SEL(dU3) and the switches S1L and S2L; and the selection circuits SER(dU1) to SER(dU3) and the switches S1R and S2R for driving the second drive electrodes TL(dU1) to TL(dU3) are placed so as to sandwich the second drive electrodes TL(dU1) to TL(dU3) and be arranged in the lateral direction in the upper-side frame area outside the display area 2. Thus, the selection circuits SEL and switches are not arranged beyond electrode widths of the first drive electrodes TL(dU1) to TL(dU3) in the longitudinal direction of the upper-side frame area, and so an increase in the upper-side frame area is suppressed. In addition, the second drive electrodes TL(dU1) to TL(dU3) are formed by, for example, Ti (titanium), AL (aluminum) or the like of a low resistance metallic material, and so a strong magnetic field can be generated even if they are narrower in wiring widths than the first drive electrodes TL(0) to TL(p) of the display area 2. In addition, by taking into account a magnetic field generated by the currents flowing also through the signal wirings TPLL and TSVL and the signal wirings TPLR and TSVR themselves, the second embodiment is designed so as to carry a current having a current value required for a total of the second drive electrodes TL(dU1) to TL(dU3), the signal wirings TPLL and TSVL, and the signal wirings TPLR and TSVR.

That is, since the second drive electrodes TL(dU1) to TL(dU3) and the signal wirings TPLR and TSVR in the upper-side frame area are placed so as to be arranged in the lateral direction, the signal wirings TPLR and TSVR can also function as the auxiliary electrodes for the magnetic field generation. If the number of second drive electrodes required for constituting one bundle (three in the present embodiment) in the upper-side frame lacks in generating a magnetic field by bundling the drive electrodes, and when the magnetic field is desired to be generated about the first to third first drive electrode TL(0) to TL(2) from the upper side 2-U of the display area 2, a magnetic field generation amount of the above drive electrodes decreases as compared with that of the vicinity of the center of the display area 2, and the detection sensitivity in the display area plane becomes non-uniform.

<Electronic Apparatus>

Figure 16:
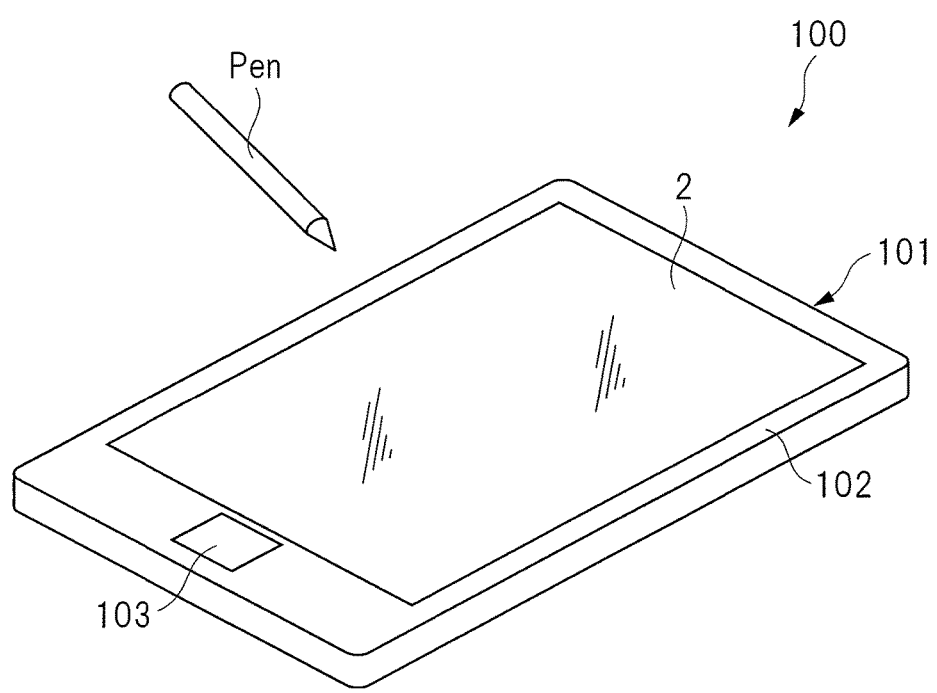
FIG. 16 is a perspective view showing an electronic apparatus according to first and second embodiments.

FIG. 16 is a perspective view showing a configuration of an electronic apparatus 100 including a display device 1 described in the first and second embodiments. The electronic apparatus 100 includes a tablet-type computer 101 having the display device 1, and a pen Pen. The pen Pen is an indicator including a coil and a capacitive element as shown in FIGS. 2A to 2C. In FIG. 16, reference numeral "2" denotes the above-described display area, and reference numeral "102" denotes a frame area placed so as to surround the display area 2. In addition, reference numeral 103 denotes a button of the computer 101.

An image is displayed on the display area 2 in the above-described display period; whether or not the pen Pen is close to the display area 2, and its coordinates are detected in the magnetic field touch detection period and the like; and the computer 101 performs a processing according to this detection result.

<Effect>

Similarly to the first embodiment also regarding the display device 1 according to the second embodiment, a display device including an input detection device for suppressing the increase in the upper-side frame area outside the display area 2 can be provided in a case of an in-cell type display device. In particular, by devising the arrangement of the second drive electrodes TL(dU1) to TL(dU3), the selection circuits SEL(dU1) to SEL(dU3), SER(dU1) to SER(dU3), the switches S1L, S2L, S1R, and S2R, and the signal wirings TPLL, TSVL, TPLR, and TSVR in the upper-side frame area outside the display area 2, the currents needed also for the second drive electrodes TL(dU1) to TL(dU3) can flow while the narrow frame is retained.

A person having an ordinary skill in the art can make various modification examples and correction examples within a scope of the idea of the present invention, and it is interpreted that the modification examples and the correction examples also belong to the scope of the present invention.

For example, the examples obtained by performing addition or elimination of components or design change or the examples obtained by performing addition or reduction of process or condition change to the embodiment described above by a person having an ordinary skill in the art are also included in the scope of the present invention as long as they include the gist of the present invention.

For example, the case where the first drive electrodes TL(0) to TL(p) and the second drive electrodes TL(dU) and TL(dD) extend in the row direction (lateral direction) and are arranged parallel to the column direction (longitudinal direction) has been described in the above-described embodiments. But, the row direction and the column direction vary depending on the viewpoint to see. Even if the viewpoint to see is varied, a case where the first drive electrodes TL(0) to TL(p) and the second drive electrodes TL(dU) and TL(dD) extend in the column direction and are arranged parallel to the row direction is also included in the scope of the present invention. In addition, the "parallel" as used in the present specification means extending from one end to the other end without crossing each other. Therefore, even if part or all of one line (or electrodes) is arranged in a state oblique with respect to the other line (or electrodes), this state is also handled as "parallel" in the present specification unless these lines intersect from the one end to the other end.

What is claimed is:

1. A display device comprising:
a plurality of pixel electrodes arranged in a display area;
a first drive electrode arranged in the display area;
a second drive electrode arranged in a frame area;
at least one first wiring provided with a first voltage,
at least one second wiring provided with a second voltage higher than the first voltage,
a first drive circuit coupled to one end of the first drive electrode;
a second drive circuit coupled to one end of the second drive electrode;
a third drive circuit coupled to another end of the first drive electrode; and
a fourth drive circuit coupled to another end of the second drive electrode,
wherein, in a first timing,
the first drive circuit is configured to provide the first voltage to the one end of the first drive electrode via the at least one first wiring,
the second drive circuit is configured to provide the second voltage to the one end of the second drive electrode via the at least one second wiring,
the third drive circuit is configured to provide the second voltage to the another end of the first drive electrode via the at least one second wiring,
the fourth drive circuit is configured to provide the first voltage to the another end of the second drive electrode via the at least one first wiring.

2. The display device according to claim 1, further comprising a third drive electrode arranged in the frame area,
wherein the first drive electrode is arranged between the second drive electrode and the third drive electrode.

3. The display device according to claim 2,
wherein the first drive electrode, the second drive electrode and the third drive electrode extend in a first direction, and
wherein the first drive electrode is arranged between the second drive electrode and the third drive electrode in a second direction crossing to the first direction.

4. The display device according to claim 1, further comprising a signal line coupled at least one of the pixel electrodes,
wherein the second drive electrode extend across the signal line.

5. The display device according to claim 1,
wherein the first drive electrode and the second drive electrode extend in a first direction and are arranged in a second direction crossing to the first direction, and
wherein a width of the second drive electrode is smaller than a width of the first drive electrode in the second direction.

6. The display device according to claim 1,
wherein the first drive electrode and the second drive electrode extend in a first direction, and are arranged in a second direction crossing to the first direction, and
wherein a length of the second drive electrode is substantially equal to a length of the first drive electrode in the first direction.

7. The display device according to claim 1,
wherein the first drive electrode and the second drive electrode extend to a first direction, and are arranged in a second direction crossing to the first direction, and
wherein a length of the second drive electrode is smaller than a length of the first drive electrode in the first direction.

8. The display device according to claim 1,
wherein the at least one first wiring includes a first sub wiring and a second sub wiring,
wherein, in the first timing,
the first drive circuit is configured to provide the first voltage to the one end of the first drive electrode via the first sub wiring, and
the fourth drive circuit is configured to provide the first voltage to the another end of the second drive electrode via the second sub wiring.

9. The display device according to claim 8,
wherein the at least one second wiring includes a third sub wiring and a fourth sub wiring,
wherein in the first timing,
the second drive circuit is configured to provide the second voltage o the one end of the second drive electrode via the third sub wiring,
the third drive circuit is configured to provide the second voltage to the another end of the first drive electrode via the fourth sub wiring.

10. The display device according to claim 1, further comprising a third drive electrode arranged between the first drive electrode and the second drive electrode in the display area.

11. The display device according to claim 10, wherein the third drive electrode doesn't provide a signal such that one side of the third drive electrode is provided with the first voltage and another side of the third drive electrode is provided with the second voltage in the first timing.

12. The display device according to claim 10, wherein the third drive electrode doesn't provide the second voltage in the first timing.

13. The display device according to claim 1, further comprising a third drive electrode arranged in the frame area,
wherein the first drive electrode, the second drive electrode and the third drive electrode extend in a first direction, and
wherein the second drive electrode is arranged between the first drive electrode and the third drive electrode in a second direction crossing to the first direction.

14. The display device according to claim 13, wherein a length of the third drive electrode is longer than a length of the second drive electrode in the first direction.

15. The display device according to claim 13, wherein the second drive circuit is arranged adjacent to the third drive electrode in the second direction.

16. The display device according to claim 13, wherein the second drive circuit is arranged an area, a part of which is surrounded the second drive electrode and the third drive electrode.

17. The display device according to claim 13, wherein one end of the third drive electrode is provided with the second voltage and another end of the third drive voltage is provided with the first voltage in the first timing.

18. The display device according to claim 1,
wherein the first drive electrode is made of first material,
wherein the second drive electrode is made of second material,
wherein resistance value of the second material is lower than resistance value of the first material.

19. The display device according to claim 18, wherein the first material is transparent conductive material, and wherein the second material is metallic material.

20. A detection device comprising:
a first drive electrode arranged in a detection area;
a second drive electrode arranged in a frame area;
at least one first wiring provided with a first voltage,
at least one second wiring provided with a second voltage higher than the first voltage,
a first drive circuit coupled to one of the first drive electrode;
a second drive circuit coupled to one end of the second drive electrode;
a third drive circuit coupled to another end of the first drive electrode; and
a fourth drive circuit coupled to another end of the second drive electrode,
wherein, in a first timing,
the first drive circuit is configured to provide the first voltage to the one end of the first drive electrode via the at least one first wiring,
the second drive circuit is configured to provide the second voltage to the one end of the second drive electrode via the at least one second wiring,
the third drive circuit is configured to provide the second voltage to the another end of the first drive electrode via the at least one second wiring,
the fourth drive circuit is configured to provide the first voltage to the another end of the second drive electrode via the at least one first wiring.

* * * * *